(12) United States Patent
Far et al.

(10) Patent No.: US 11,467,805 B1
(45) Date of Patent: Oct. 11, 2022

(54) DIGITAL APPROXIMATE MULTIPLIERS FOR MACHINE LEARNING AND ARTIFICIAL INTELLIGENCE APPLICATIONS

(71) Applicant: Ali Tasdighi Far, San Jose, CA (US)

(72) Inventors: Ali Tasdighi Far, San Jose, CA (US); Jerry M. Collings, Paso Robles, CA (US)

(*) Notice: Subject to any disclaimer, the term of this patent is extended or adjusted under 35 U.S.C. 154(b) by 0 days.

(21) Appl. No.: 17/097,684

(22) Filed: Nov. 13, 2020

Related U.S. Application Data

(63) Continuation-in-part of application No. 16/925,803, filed on Jul. 10, 2020.

(51) Int. Cl.
 G06F 7/52 (2006.01)
 G06F 9/448 (2018.01)
 G06F 7/523 (2006.01)

(52) U.S. Cl.
 CPC ............... G06F 7/52 (2013.01); G06F 9/4498 (2018.02); G06F 7/5235 (2013.01)

(58) Field of Classification Search
 CPC . G06F 7/52; G06F 7/552; G06F 7/523; G06F 7/5235; G06F 9/4498; G06F 17/17
 See application file for complete search history.

(56) References Cited

U.S. PATENT DOCUMENTS

| | | |
|---|---|---|
| 3,013,724 A | 12/1961 | Thompson et al. |
| 3,084,862 A | 4/1963 | Nathan |
| 3,102,951 A | 9/1963 | Nathan |
| 3,106,639 A | 10/1963 | Nathan |
| 3,120,605 A | 2/1964 | Nathan et al. |
| 3,197,626 A | 7/1965 | Platzer et al. |
| 3,253,135 A | 5/1966 | Collings et al. |
| 3,261,971 A | 7/1966 | Nathan |
| 3,296,429 A | 1/1967 | Nathan |
| 3,304,419 A | 2/1967 | Huntley, Jr. et al. |

(Continued)

OTHER PUBLICATIONS

R.H. Whigham, A fast 10v diode quarter square multiplier, Pennsylvania State University, 1965, downloaded from sim.sagepub.com (Year: 1965).*

(Continued)

*Primary Examiner* — Emily E Larocque

(57) ABSTRACT

Digital approximate multipliers (aMULT) utilizing interpolative apparatuses, circuits, and methods are described in this disclosure. The disclosed aMULT interpolative methods can be arranged or programmed to operate asynchronously and or synchronously. For applications where less precision is acceptable, fewer interpolations can yield less precise multiplication results, while such approximate multiplication can be computed faster and at lower power consumption. Conversely, for applications where higher precision is required, more interpolations can generate more precise multiplication results. As such, by utilizing the disclosed aMULT method, the resolution and precision objectives of an approximate multiplication function can be pre-programmed or adjusted real-time and or on the fly, which enables optimizing for different and flexible power consumption and speed of multiplication, in addition to enabling the optimization of an approximate multiplier's die size and cost in accordance with cost-performance objectives.

3 Claims, 15 Drawing Sheets

(56) References Cited

U.S. PATENT DOCUMENTS

| | | | |
|---|---|---|---|
| 3,536,904 A | 10/1970 | Jordan, Jr. et al. |
| 3,543,288 A | 11/1970 | Collings |
| 3,562,553 A | 2/1971 | Roth |
| 3,610,906 A | 10/1971 | Stampler et al. |
| 3,621,226 A | 11/1971 | Wittlinger |
| 3,633,005 A | 1/1972 | Leighton |
| 3,683,165 A | 8/1972 | Grobert et al. |
| 3,689,752 A | 9/1972 | Gilbert |
| 3,838,262 A | 9/1974 | Van De Plassche |
| 3,858,036 A | 12/1974 | Lunsford |
| 3,956,622 A | 5/1976 | Lyon |
| 3,956,643 A | 5/1976 | Hite |
| 3,959,639 A | 5/1976 | Köethmann |
| 4,001,602 A | 1/1977 | Birchenough |
| 4,004,141 A | 1/1977 | Curtis |
| 4,071,777 A | 1/1978 | Herrmann |
| 4,156,283 A | 5/1979 | Gilbert |
| 4,181,967 A | 1/1980 | Nash et al. |
| 4,308,471 A | 12/1981 | Misawa |
| 4,353,000 A | 10/1982 | Noda |
| 4,387,439 A | 6/1983 | Lin |
| 4,482,977 A | 11/1984 | Ross |
| 4,514,825 A * | 4/1985 | Nordling | G06F 7/5235 375/222 |
| 4,546,275 A | 10/1985 | Pena-Finol et al. |
| 4,572,975 A | 2/1986 | Bowers |
| 4,586,155 A | 4/1986 | Gilbert |
| 4,677,369 A | 6/1987 | Bowers et al. |
| 4,707,798 A | 11/1987 | Nakano |
| 4,817,028 A | 3/1989 | Masson et al. |
| 4,999,521 A | 3/1991 | Rusznyak |
| 5,042,001 A | 8/1991 | Brightman et al. |
| 5,107,150 A | 4/1992 | Kimura |
| 5,122,687 A | 6/1992 | Schmidt |
| 5,157,350 A | 10/1992 | Rubens |
| 5,220,525 A | 6/1993 | Anderson et al. |
| 5,254,889 A | 10/1993 | Han |
| 5,268,857 A | 12/1993 | Chen et al. |
| 5,283,579 A | 2/1994 | Tasdighi |
| 5,294,927 A | 3/1994 | Levinson et al. |
| 5,337,267 A | 8/1994 | Colavin |
| 5,381,352 A | 1/1995 | Shou et al. |
| 5,389,840 A | 2/1995 | Dow |
| 5,434,809 A | 7/1995 | Taniguchi |
| 5,617,346 A | 4/1997 | Inoue |
| 5,629,885 A | 5/1997 | Pirson et al. |
| 5,640,084 A | 6/1997 | Tero et al. |
| 5,668,710 A | 9/1997 | Caliboso et al. |
| 5,734,260 A | 3/1998 | Tasdighi et al. |
| 5,734,291 A | 3/1998 | Tasdighi et al. |
| 5,805,007 A | 9/1998 | Colli |
| 5,814,995 A | 9/1998 | Tasdighi |
| 5,912,834 A | 6/1999 | Kimura |
| 5,923,208 A | 7/1999 | Tasdighi et al. |
| 6,005,374 A | 12/1999 | Tasdighi |
| 6,018,758 A | 1/2000 | Griesbach et al. |
| 6,032,169 A | 2/2000 | Malzahn et al. |
| 6,054,823 A | 4/2000 | Collings et al. |
| 6,122,284 A | 9/2000 | Tasdighi et al. |
| 6,205,458 B1 | 3/2001 | Beiu |
| 6,260,056 B1 | 7/2001 | Dalal |
| 6,298,368 B1 | 10/2001 | Miller, Jr. |
| 6,301,598 B1 | 10/2001 | Dierke et al. |
| 6,393,453 B1 | 5/2002 | Purcell |
| 6,463,452 B1 | 10/2002 | Schulist |
| 6,490,608 B1 | 12/2002 | Zhu |
| 6,535,901 B1 | 3/2003 | Grisamore |
| 6,721,774 B1 | 4/2004 | Lee et al. |
| 6,763,367 B2 | 7/2004 | Kwon et al. |
| 6,883,011 B2 | 4/2005 | Rumynin et al. |
| 6,941,334 B2 | 9/2005 | Rogenmoser et al. |
| 6,978,426 B2 | 12/2005 | Parhi et al. |
| 6,982,588 B1 | 1/2006 | Lin et al. |
| 7,003,544 B1 | 2/2006 | Langhammer |
| 7,024,448 B2 | 4/2006 | Matsugaki et al. |
| RE39,385 E | 11/2006 | Brightman et al. |
| 7,139,788 B2 | 11/2006 | Talwar et al. |
| 7,197,292 B1 | 3/2007 | Kouwenhoven et al. |
| 7,206,801 B2 | 4/2007 | Chang et al. |
| 7,266,579 B2 | 9/2007 | Dupaquis et al. |
| 7,308,471 B2 | 12/2007 | Rumynin |
| 7,313,585 B2 | 12/2007 | Winterrowd |
| 7,318,080 B2 | 1/2008 | Berkeman |
| 7,334,200 B2 | 2/2008 | Parhi et al. |
| 7,437,401 B2 | 10/2008 | Zheng et al. |
| 7,562,106 B2 | 7/2009 | Lablans |
| 7,702,716 B2 | 4/2010 | Rösener |
| 7,739,324 B1 | 6/2010 | Das et al. |
| 8,407,277 B1 | 3/2013 | Das |
| 8,610,486 B1 | 12/2013 | Al-Absi et al. |
| 8,639,737 B2 | 1/2014 | Shearer |
| 8,707,225 B1 | 4/2014 | Das |
| 8,819,094 B2 | 8/2014 | Han et al. |
| 8,862,652 B2 | 10/2014 | Drane |
| 9,043,735 B1 | 5/2015 | Das et al. |
| 9,519,304 B1 | 12/2016 | Far |
| 9,684,489 B2 | 6/2017 | Thornton |
| 9,698,779 B2 | 7/2017 | Varadarajan et al. |
| 9,780,652 B1 | 10/2017 | Far |
| 9,793,912 B1 | 10/2017 | Ferris et al. |
| 9,921,600 B1 | 3/2018 | Far |
| 10,177,713 B1 | 1/2019 | Far |
| 10,198,022 B1 | 2/2019 | Far |
| 10,411,597 B1 | 9/2019 | Far |
| 10,491,167 B1 | 11/2019 | Far |
| 10,536,117 B1 | 1/2020 | Far |
| 10,560,058 B1 | 2/2020 | Far |
| 10,581,448 B1 | 3/2020 | Far |
| 10,594,334 B1 | 3/2020 | Far |
| 10,700,695 B1 | 6/2020 | Far |
| 2003/0184338 A1 | 10/2003 | Comer et al. |
| 2006/0170580 A1 | 8/2006 | Lauritzen et al. |
| 2008/0036523 A1 | 2/2008 | Nijrolder |
| 2014/0043074 A1 | 2/2014 | Li et al. |
| 2015/0123724 A1 | 5/2015 | Al-Absi et al. |
| 2016/0248437 A1 | 8/2016 | Zhang et al. |
| 2020/0310761 A1* | 10/2020 | Rossi | G06F 7/722 |

OTHER PUBLICATIONS

R. Zendegani et al., RoBA Multiplier: A Rounding-Based Approximate Multiplier for High-Speed yet Energy-Efficient Digital Signal Processing, IEEE Transactions on Very Large Scale Integration (VLSI) Systems, vol. 25, No. 2, 2017 (Year: 2017).*

D.A Patterson et al., Computer Organization and Design: The Hardware/Software Interface, Elsevier Science & Technology, 2007 Chapter 3 (Year: 2007).*

A. Far, "Small size class AB amplifier for energy harvesting with ultra low power, high gain, and high CMRR," 2016 IEEE International Autumn Meeting on Power, Electronics and Computing (ROPEC), Ixtapa, 2016, pp. 1-5.

A. Far, "Compact ultra low power class AB buffer amplifier," 2017 IEEE International Autumn Meeting on Power, Electronics and Computing (ROPEC), Ixtapa, 2017, pp. 1-6.

A. Far, "Subthreshold current reference suitable for energy harvesting: 20ppm/C and 0.1%/V at 140nW," 2015 IEEE International Autumn Meeting on Power, Electronics and Computing (ROPEC), Ixtapa, 2015, pp. 1-4.

A. Far, "Amplifier for energy harvesting: Low voltage, ultra low current, rail-to-rail input-output, high speed," 2016 IEEE International Autumn Meeting on Power, Electronics and Computing (ROPEC), Ixtapa, 2016, pp. 1-6.

A. Far, "Class AB amplifier with noise reduction, speed boost, gain enhancement, and ultra low power," 2018 IEEE 9th Latin American Symposium on Circuits & Systems (LASCAS), Puerto Vallarta, Mexico, 2018, pp. 1-4.

A. Far, "Low noise rail-to-rail amplifier runs fast at ultra low currents and targets energy harvesting," 2017 IEEE International Autumn Meeting on Power, Electronics and Computing (ROPEC), Ixtapa, 2017, pp. 1-6.

(56) References Cited

OTHER PUBLICATIONS

A. Far, "A 5μW fractional CMOS bandgap voltage and current reference," 2013 IEEE Global High Tech Congress on Electronics, Shenzhen, 2013, pp. 7-11.

A. Far, "A 400nW CMOS bandgap voltage reference," 2013 International Conference on Electrical, Electronics and System Engineering (ICEESE), Kuala Lumpur, 2013, pp. 15-20.

A. Far, "Enhanced gain, low voltage, rail-to-rail buffer amplifier suitable for energy harvesting," 2017 IEEE International Autumn Meeting on Power, Electronics and Computing (ROPEC), Ixtapa, 2017, pp. 1-6.

A. Far, "Subthreshold bandgap voltage reference aiming for energy harvesting: 100na, 5 ppm/c, 40 ppm/v, psrr-88db," 2015 IEEE 5th International Conference on Consumer Electronics—Berlin (ICCE-Berlin), Berlin, 2015, pp. 310-313.

A. Far, "A 220nA bandgap reference with 80dB PSRR targeting energy harvesting," 2016 IEEE Canadian Conference on Electrical and Computer Engineering (CCECE), Vancouver, BC, 2016, pp. 1-4.

A. Far, "Sub-1 volt class AB amplifier with low noise, ultra low power, high-speed, using winner-take-all," 2018 IEEE 9th Latin American Symposium on Circuits & Systems (LASCAS), Puerto Vallarta, Mexico, 2018, pp. 1-4.

A. Far, "A low supply voltage 2μW half bandgap reference in standard sub-μ CMOS," 2014 IEEE International Conference on Electronics, Computing and Communication Technologies (CONECCT), Bangalore, 2014, pp. 1-5.

A. Far, "Current reference for energy harvesting: 50um per side, At 70 nW, regulating to 125C," 2014 IEEE International Autumn Meeting on Power, Electronics and Computing (ROPEC), Ixtapa, 2014, pp. 1-5.

* cited by examiner

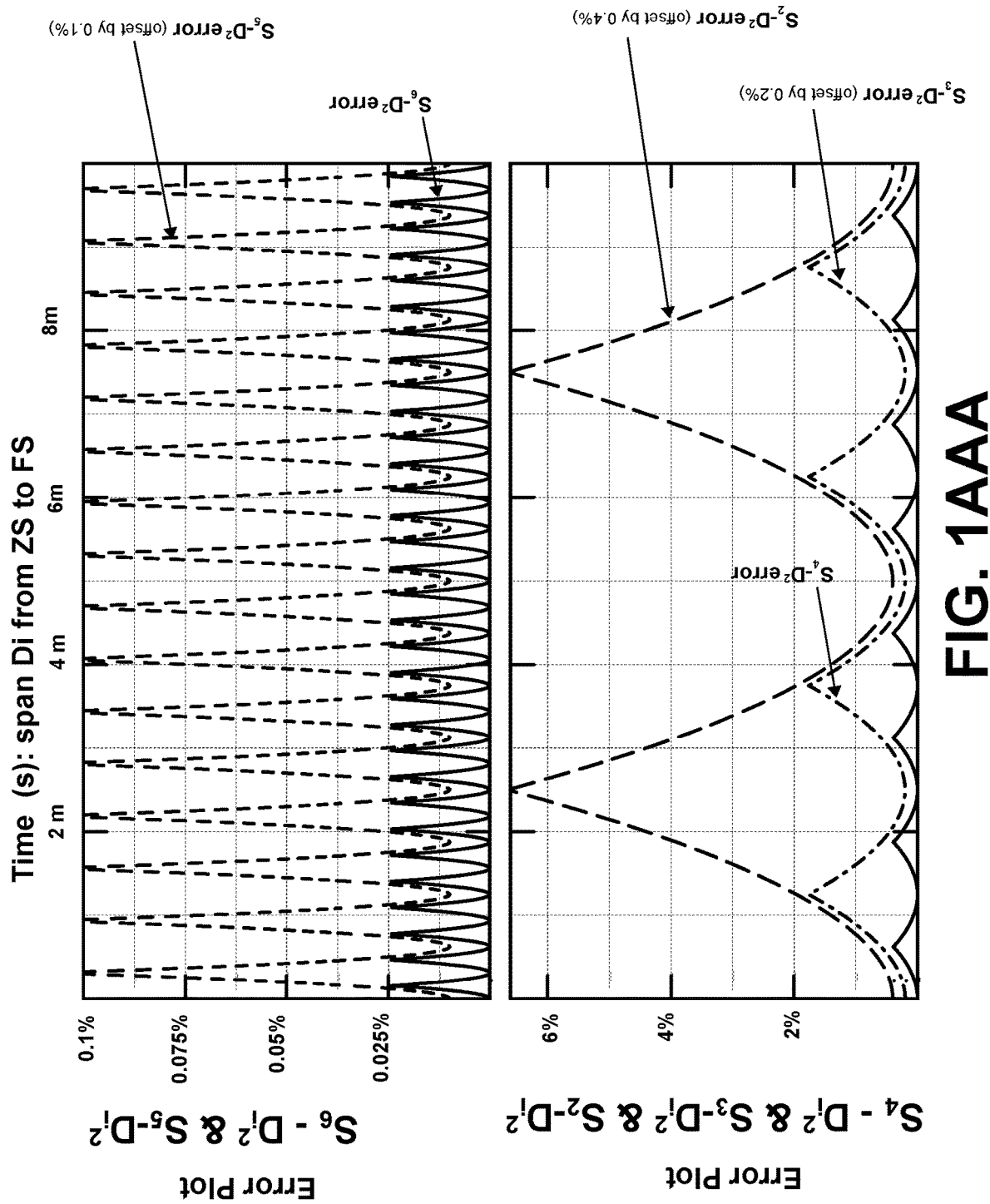

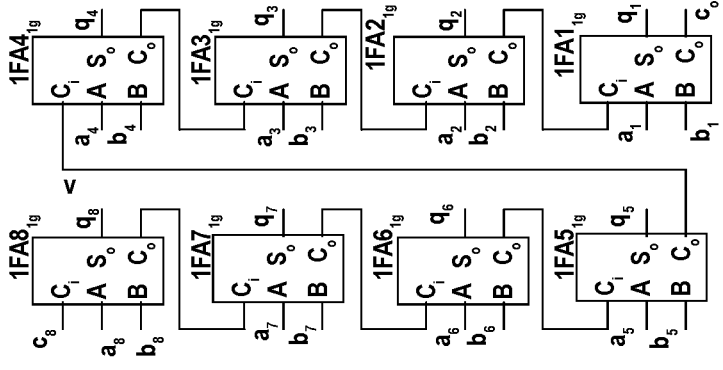
FIG. 1G
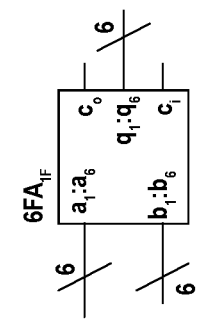
FIG. 1H
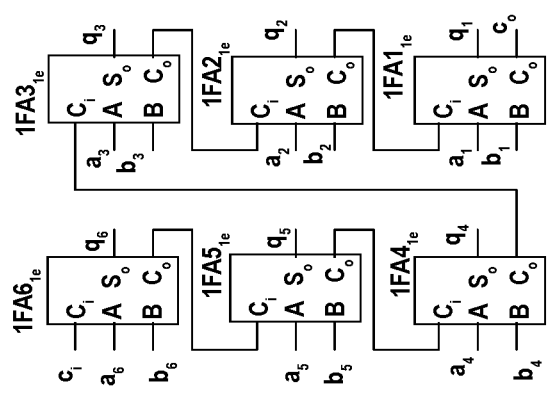
FIG. 1E
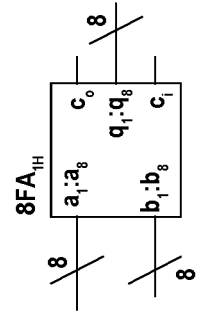
FIG. 1F
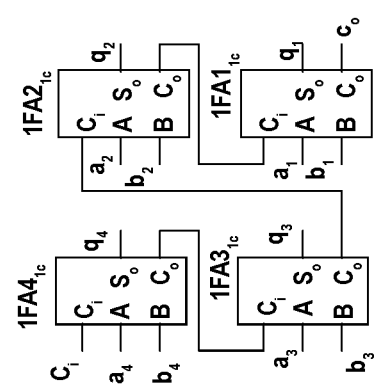
FIG. 1C
FIG. 1D

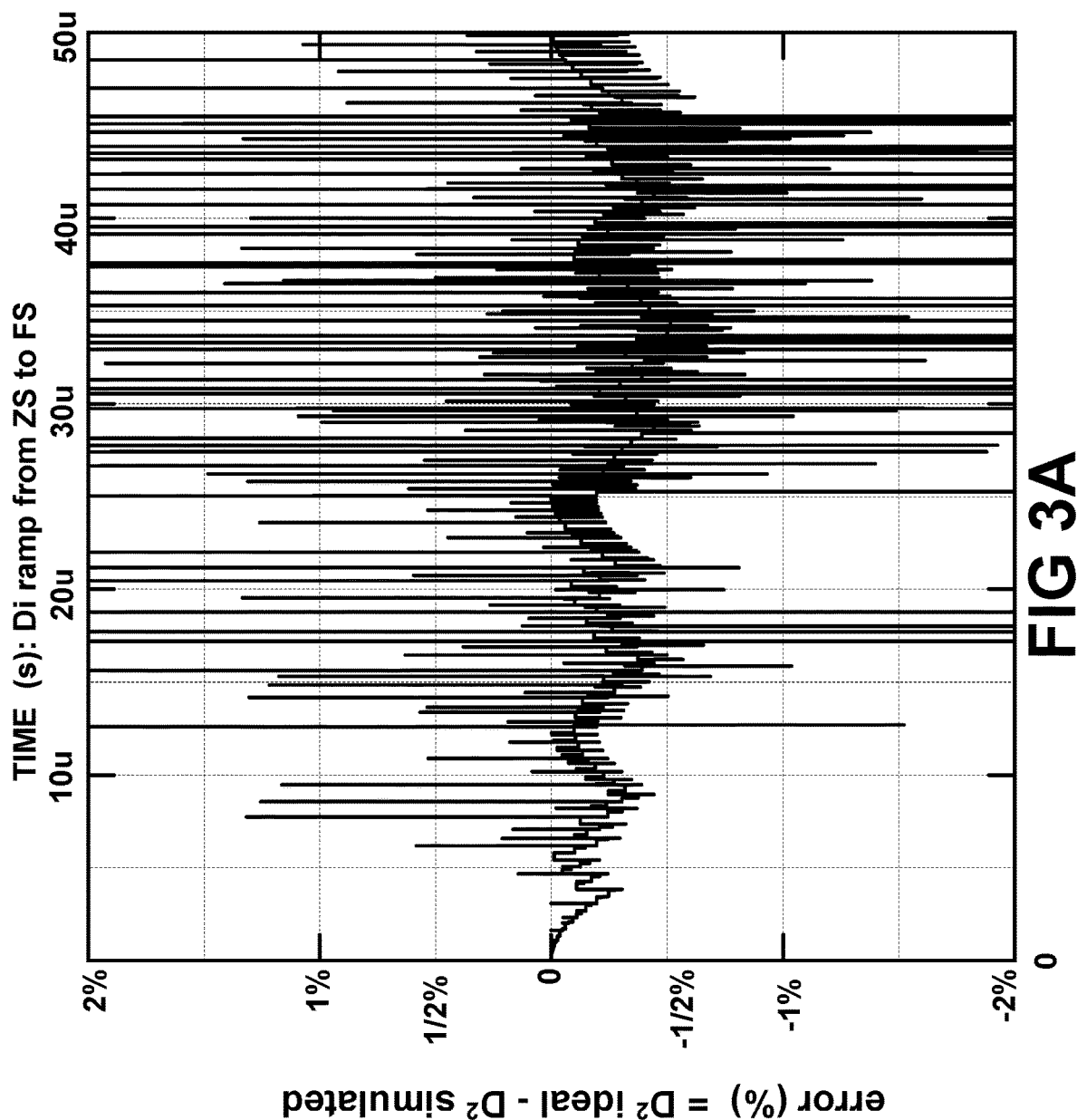

DIGITAL APPROXIMATE MULTIPLIERS FOR MACHINE LEARNING AND ARTIFICIAL INTELLIGENCE APPLICATIONS

FIELD OF DISCLOSURE

The present invention relates to improvements in digital integrated circuit (IC) squarers, multipliers, dividers, including square accumulate (SAC), and multiply accumulate (MAC) functions.

BACKGROUND

Approximate and non-linear signal processing, including approximate square and multiplication, are required in many computational applications such as machine learning and artificial intelligence where plurality of squarer and multiplier ICs may be needed in a chip having low costs, low power consumption, and mid-to-high precision.

Generally speaking, cost and power consumption of conventional digital squarer ICs and multiplier ICs increase substantially with wider bit-sizes of digital inputs (i.e., higher resolutions).

Until recently, continued innovations in semiconductor manufacturing have not only fueled significant and predictable reductions in IC costs, but advancements in fabrication technologies have also enabled packing more transistors and more interconnections with higher functions in smaller ICs that can run faster with higher resolutions compared to previous generation ICs. Such manufacturing advancements have provided technology markets with the tools, platforms, and the return on investment incentives to grow the world's digital economies while counting on reliable cost-performance improvements, consistent with the predictions of the Moore's law.

Given the likelihood that Moore's law is near or at the end of its rope, IC manufacturing and fabrication technologies may be running out of steam in continuing to be the primary anchor and fuel for performance improvements and die size and cost reduction. Despite such trajectory toward the end of Moore's law, demand for smaller high performance and highly integrated ICs (for lower cost chips) not only persists but is also accelerating.

As such, when we approach the end of Moore's law era, semiconductor manufacturing advancements (that enabled making faster smaller transistors and denser interconnects for the last several decades) can no longer do the heavy lifting to improve the cost-performance of ICs.

Therefore, there is even a more desperate need, as a matter of both priority and necessity, for innovative IC designs and fundamentally more efficient signal processing algorithms to perform computations such as addition and multiplication, which are key functions needed in machine learning and artificial intelligent applications.

Especially where safety, privacy, and low latency are must-have features in distributed intelligence applications near or at the sensors, which are far from the cloud and away from the fog, machine learning and artificial intelligence ICs need to be small, low cost, consume low powers and have reasonable precision.

Striking a balance in IC design that achieves the above traits are the objectives of this invention.

SUMMARY OF THE INVENTION

Considering the above, it is an objective of the present disclosure to provide improvements in the IC design, signal conditioning algorithm, architecture, and arrangements for squarers and multipliers including (but not limited to) the following:

An objective of this disclosure is to provide digital approximate squarer ICs suitable for digital approximate computing.

An objective of this disclosure is to provide digital approximate multiplier ICs suitable for digital approximate computing.

An objective of this invention is to provide all digital approximate squarer and multiplier wherein the imprecision (error) attributed to the approximation of squaring or multiplying is substantially constant (i.e., substantially insensitive to manufacturing process, temperate, and power supply. As such, the squarer or multiplier approximation imprecisions can be accounted for and factored in during training (of an artificial intelligence IC or machine learning IC) and thus help retain or gain-back the accuracy of the overall artificial intelligence IC or machine learning IC in the factory and the field.

Another objective of the present invention is to utilize digital approximate squaring ICs to perform approximate multiplication by utilizing the quarter square method. Accordingly, digital multiplication can be performed by deducting the square of subtraction of two digital words (x, y) from the square of their summation as in $(x+y)^2 + (x-y)^2 = 4xy$.

Another objective of the present invention is to provide a digital IC approximate squarer and approximate multiplication functions whose degree of approximation can be pre-programed and or programmed real-time (on the fly) depending on the application and or different set of the real-time data. In other words, for an application with a set of data that needs more precision (less approximation), the approximate squarer and or approximate multiplier can be programmed on the fly to compute the squaring of the set of data with less approximation via more interpolations. Conversely, in the same application wherein another set of data needs less precision (more approximation), the approximate squarer and or multiplier can (on the fly) be programmed real-time differently to compute the squaring of the another set of data with more approximation via fewer interpolations, which can save on power consumption and computation speed. Such a capability would enable optimizing digital computation ICs (pre-programmed or real-time programming) for precision versus speed versus power consumption versus cost, as required by the objectives of the application and its respective data-sets.

Another objective of this disclosure is to provide digital approximate squarer and approximate multiplier ICs with fewer transistors which occupies smaller area and cost less.

Considering that generally in a digital chip the more gate counts the higher power consumption of the chip, another objective of this invention is to provide the digital approximate squarer and multiplier ICs as having lower power consumption.

Another objective of this invention is to provide cost effective and low power digital approximate square and accumulate (SAC) ICs for cost sensitive and power sensitive machine learning and artificial intelligence applications such as in distributed intelligence.

Another objective of this invention is to provide cost effective and low power digital approximate multiply and accumulate (MAC) ICs for cost sensitive and power sensitive machine learning and artificial intelligence applications near or at the sensors.

Another objective of this invention is to provide a single or few asynchronous and synchronous digital approximate squarer ICs and or approximate multiplier ICs that can be time multiplexed or digitally shared in order to generate many (plurality of) squaring and or multiplication functions, which enables computation scaling and system design flexibility.

Another objective of this invention is to provide asynchronous and synchronous digital approximate SAC ICs for low-power and low-cost machine learning and artificial intelligence applications near or at sensors.

Utilizing the disclosed digital approximate squarer (through the quarter square method to perform approximate multiplication), another objective of this invention is to provide digital approximate MAC ICs for low-cost and low-power machine learning and artificial intelligence applications at the ultra-edge.

Utilizing the disclosed digital approximate squarer (through the quarter square method to perform approximate multiplication), another objective of this invention is to provide plurality of digital MAC ICs that can be utilized in digital IC artificial neural networks (ANN) for low-cost and low-power machine learning and artificial intelligence applications near or at sensors where plurality of computations are required.

Another objective of the present invention is to provide mixed-mode approximate squaring and or mixed-mode approximate multiplications, wherein the internal summation and or subtraction functions of the approximate squaring and or multiplication can be performed in analog and or mixed-mode (current-mode and or voltage mode). For example, plurality of outputs of approximate digital squarer ICs or approximate digital multiplier ICs can be inputted to plurality of current mode Digital-to-Analog-Converters (iDACs) wherein by the function of summation (e.g., adding two multiplications) can be performed simply by coupling together the current output terminals of plurality of iDACs.

Another objective of the present invention is to utilize mixed-mode approximate squarer method and mixed-mode approximate multiplier method in a mixed-mode approximate SAC ICs and or MAC ICs, wherein the summation and subtraction functions of the SAC and MAC can be performed in analog or mixed mode (current-mode and or voltage mode).

An aspects of the embodiments disclosed herein include an approximate digital squaring (aSQR) method in a digital state machine in an integrated circuit, the method comprising: receiving an at least one input digital word ($D_i$), wherein the at least one $D_i$ has a digital value spanning from zero scale (ZS) to full scale (FS); programming at least one total number of digital interpolation steps (n); initializing each digital word of an at least one digital array O to zero, wherein each of the at least one digital array O is comprised of a plurality of digital words; initializing each digital word of an at least one digital array P to zero, wherein each of the at least one digital array P is comprised of a plurality of digital words; beginning at an at least one first digital interpolation step of j=1 and ending at a digital interpolation step of j=n, generating and storing an at least one sequence of digital words into the at least one digital array O respectively into digital words $O_j$ by adding: an at least one respective sequence of $$2 \times \sum_{k=1}^{j-1} P_j$$

digital words to an at least one respective sequence of $FS/2^j$ digital words, and subtracting the result of that addition from a respective at least one $D_i$ word, generating an at least one selected digital sequence by selecting a sequence of an at least one maximum of an at least one digital words $O_i$ and a digital zero word, and storing the at least one selected digital sequence into the at least one digital array P respectively into digital words $P_j$. Further aspect of the approximate digital squaring (aSQR) method in a digital state machine in an integrated circuit, the method further comprising: generating an at least one $S_n$ signal by respectively computing at least one summation $$\sum_{j=1}^{n} P_j \times 1/2^{(j-2)}$$

at each of a summation step j beginning at a first summation step and ending at a summation step of n; and wherein the at least one $S_n$ signal is an approximate equivalent square of the at least one $D_i$ (~$D_i^2$). Further aspect of approximate digital squaring (aSQR) method in a digital state machine in an integrated circuit, the method further comprising: programming a plurality n of digital interpolation steps, real-time on the fly, generating a plurality of respective $S_n$ signals, real-time on the fly; and wherein the plurality of respective $S_n$ signals are the respective approximate equivalents of the respective squares of a plurality of the at least one $D_i$, corresponding respectively to the plurality of n digital interpolation steps. Further aspect of the approximate digital squaring (aSQR) method in a digital state machine in an integrated circuit, the method further comprising: performing the summation functions in computing the respective $$\sum_{j=1}^{n} P_j \times 1/2^{(j-2)}$$

by utilizing at least one of an at least one digital adder and an at least one analog adder to generate the at least one $S_n$ signal; and wherein the at least one analog adder is comprised of an at least one Digital-to-Analog-Converter (DAC). Further aspect of the approximate digital squaring (aSQR) method in a digital state machine in an integrated circuit, the method further comprising: generating an at least one summing absolute value digital word ($|Di_s|$), wherein the at least one $|Di_s|$ digital word is an at least one summation of an at least two digital words (X+Y); generating an at least one deducting absolute value digital word ($|Di_d|$), wherein the at least one $|Di_d|$ digital word is an at least one subtraction of an at least two digital words (X−Y); generating an at least one summing approximate square signal ($S_{n_s}$), wherein $S_{n_s}$ is an approximate equivalence of the square of $|Di_s|$ ($|Di_s|^2$); and generating an at least one deducting approximate square signal ($S_{n_d}$), wherein $S_{n_d}$ is an approximate equivalence of the square of $|Di_d|$ ($|Di_d|^2$). Further aspect of the approximate digital squaring (aSQR) method in a digital state machine in an integrated circuit, the method further comprising: generating an at least one approximate multiplication signal (~(4X×Y)) by subtracting the at least one $S_{n_d} \approx |Di_d|^2$ signal from the at least one $S_{n_s} \approx |Di_s|^2$ signal; performing the subtracting in computing the ~(4X×Y) signal by utilizing at least one of an at least one digital subtractor and an at least one analog subtractor; and wherein the at least one analog subtractor is comprised of an at least one Digital-to-Analog-Converter (DAC). Further aspect of the approximate digital squaring (aSQR) method in a digital state machine in an integrated circuit, the method further comprising: generating an at least one plurality of approximate $\sim(4X \times Y)$ signals; generating an at least one approximate multiply-accumulate signal $(\Sigma \sim(4X \times Y))$ by combining more than the at least one plurality of approximate $\sim(4X \times Y)$ signals; generating an at least one offset signal (B); generating an at least one offsetting approximate multiply-accumulate signal $(\Sigma \sim(4X \times Y)+B)$ by combining the at least one approximate $\Sigma \sim(4X \times Y)$ analog signal with the at least one B signal. Further aspect of the approximate digital squaring (aSQR) method in a digital state machine in an integrated circuit, the method further comprising: combining an at least one plurality of the $\Sigma \sim(4X \times Y)+B$ signal to arrange an at least one artificial neural network (ANN).

Another aspects of the embodiments disclosed herein include an approximate digital squaring (a'SQR) method in a digital state machine in an integrated circuit, the method comprising: receiving at least one input digital word ($D_i$), wherein the at least one $D_i$ has a digital value spanning from zero scale (ZS) to full scale (FS); subtracting an at least one digital word having a value of one half of FS from the at least one $D_i$ digital word to generate an at least one first offset digital word ($O_1$), wherein $O_1 = D_i - FS \times 2^{-1}$; selecting an at least one first maximum of the at least one $O_1$ digital word, and an at least a digital word having a value of ZS, to generate an at least one first positive digital word ($P_1$), wherein $P_1 = \max(O_1, ZS)$; subtracting the sum of 2 times the at least one $P_1$ digital word and an at least one digital word having a value of $\frac{1}{4}^{th}$ of FS from the at least one $D_i$ digital word to generate an at least one second offset digital word ($O_2$), wherein $O_2 = D_i - (FS \times 2^{-2} + 2 \times P_1)$; and selecting an at least one second maximum of the at least one $O_2$ digital word and an at least one digital word having a value of ZS to generate an at least one second positive digital word ($P_2$), wherein $P_2 = \max(O_2, ZS)$. Further aspect of The approximate digital squaring (a'SQR) method in a digital state machine in an integrated circuit, the method further comprising: generating at least one $S_2$ signal, wherein $S_2 = 2^1 \times P_1 + 2^0 \times P_2 \approx D_{i2}^2$; and wherein the at least one $S_2$ signal represents an at least one square approximation of the at least one $D_i$ ($\sim D_{i2}^2$). Another aspect of the approximate digital squaring (a'SQR) method in a digital state machine in an integrated circuit, the method further comprising: subtracting the sum of 2 times the at least one $P_1$ digital word, 2 times the at least one $P_2$ digital word, and an at least one digital word having a value of $\frac{1}{8}^{th}$ of FS from the at least one $D_i$ digital word to generate an at least one third offset digital word ($O_3$), wherein $O_3 = D_i - (FS \times 2^{-2} + 2 \times P_1 + 2 \times P_2)$; and selecting an at least one third maximum of the at least one $O_3$ digital word and an at least one digital word having a value of ZS to generate an at least one third positive digital word ($P_3$), wherein $P_3 = \max(O_3, ZS)$. Further aspect of the approximate digital squaring (a'SQR) method in a digital state machine in an integrated circuit, the method further comprising: generating an at least one $S_3$, wherein $S_3 = 2^1 \times P_1 + 2^0 \times P_2 + 2^{-1} \times P_3 \approx D_{i3}^2$; and wherein the at least one $S_3$ signal represent an at least one square approximation of the at least one $D_i$ ($\sim D_{i3}^2$). Another aspect of the approximate digital squaring (a'SQR) method in a digital state machine in an integrated circuit, the method further comprising: subtracting the sum of 2 times the at least one $P_1$ digital word, 2 times the at least one $P_2$ digital word, 2 times the at least one $P_3$, and an at least one digital word having a value of $\frac{1}{16}^{th}$ of FS from the at least one $D_i$ digital word to generate an at least one fourth offset digital word ($O_4$), wherein $O_4 = D_i - (FS \times 2^{-2} + 2 \times P_1 + 2 \times P_2 + 2 \times P_3)$; and selecting an at least one fourth maximum of the at least one $O_4$ digital word and an at least one digital word having a value of ZS to generate an at least one fourth positive digital word ($P_4$), wherein $P_4 = \max(O_4, ZS)$. Further aspect of the approximate digital squaring (a'SQR) method in a digital state machine in an integrated circuit, the method further comprising: generating at least one $S_4$, wherein $S_4 = 2^1 \times P_1 + 2^0 \times P_2 + 2^{-1} \times P_3 + 2^{-2} \times P_4 \approx D_{i4}^2$; and wherein the at least one $S_4$ signal represent an at least one square approximation of the at least one $D_i$ ($\sim D_{i4}^2$). Another aspect of the approximate digital squaring (a'SQR) method in a digital state machine in an integrated circuit, the method further comprising: subtracting the sum of 2 times the at least one $P_1$ digital word, 2 times the at least one $P_2$ digital word, 2 times the at least one $P_3$, 2 times the at least one $P_4$, and an at least one digital word having a value of $\frac{1}{32}^{nd}$ of FS from the at least one $D_i$ digital word to generate an at least one fifth offset digital word ($O_5$), wherein $O_5 = D_i - (FS \times 2^{-2} + 2 \times P_1 + 2 \times P_2 + 2 \times P_3 + 2 \times P_4)$; and an at least one fourth maximum of the at least one $O_5$ digital word and an at least one digital word having a value of ZS to generate an at least one fifth positive digital word ($P_5$), wherein $P_5 = \max(O_5, ZS)$. Further aspect of the approximate digital squaring (a'SQR) method in a digital state machine in an integrated circuit, the method further comprising: generating an at least one $S_5$, wherein $S_5 = 2^1 \times P_1 + 2^0 \times P_2 + 2^{-1} \times P_3 + 2^{-2} \times P_4 + 2^{-3} \times P_5 \approx D_{i5}^2$; and wherein the at least one $S_5$ signal represent an at least one square approximation of the at least one $D_i$ ($\sim D_{i5}^2$). Further aspect of the approximate digital squaring (a'SQR) method in a digital state machine in an integrated circuit, the method further comprising: subtracting the sum of 2 times the at least one $P_1$ digital word, 2 times the at least one $P_2$ digital word, 2 times the at least one $P_3$, 2 times the at least one $P_4$, 2 times the at least one $P_5$, and an at least one digital word having a value of $\frac{1}{64}^{th}$ of FS from the at least one $D_i$ digital word to generate an at least one sixth offset digital word ($O_6$), wherein $O_6 = D_i - (FS \times 2^{-2} + 2 \times P_1 + 2 \times P_2 + 2 \times P_3 + 2 \times P_4 + 2 \times P_5)$; and selecting an at least one fourth maximum of the at least one $O_6$ digital word and an at least one digital word having value of ZS to generate an at least one sixth positive digital word ($P_6$), wherein $P_6 = \max(O_6, ZS)$. Further aspect of the approximate digital squaring (a'SQR) method in a digital state machine in an integrated circuit, the method further comprising: generating at least one $S_6$, wherein $S_6 = 2^1 \times P_1 + 2^0 \times P_2 + 2^{-1} \times P_3 + 2^{-2} \times P_4 + 2^{-3} \times P_5 + 2^{-4} \times P_6 \approx D_{i6}^2$; and wherein the at least one $S_6$ signal represent an at least one square approximation of the at least one $D_i$ ($\sim D_{i6}^2$). Further aspect of the approximate digital squaring (a'SQR) method of in a digital state machine in an integrated circuit, the method further comprising: generating an at least one of $S_2$, $S_3$, $S_4$, $S_5$, and $S_6$; wherein $S_2 = 2^1 \times P_1 + 2^0 \times P_2 \approx D_{i2}^2$; wherein $S_3 = 2^1 \times P_1 + 2^0 \times P_2 + 2^{-1} \times P_3 \approx D_{i3}^2$; wherein $S_4 = 2^1 \times P_1 + 2^0 \times P_2 + 2^{-1} \times P_3 + 2^{-2} \times P_4 \approx D_{i4}^2$; wherein $S_5 = 2^1 \times P_1 + 2^0 \times P_2 + 2^{-1} \times P_3 + 2^{-2} \times P_4 + 2^{-3} \times P_5 \approx D_{i5}^2$; wherein $S_6 = 2^1 \times P_1 + 2^0 \times P_2 + 2^{-1} \times P_3 + 2^{-2} \times P_4 + 2^{-3} \times P_5 + 2^{-4} \times P_6 \approx D_{i6}^2$; wherein the summing of the at least one of $P_1$ through $P_6$ digital words is performed by at least one digital adder and converting the at least one of $P_1$ through $P_6$ digital words to analog by at least one of digital-to-analog converter (DAC) wherein the outputs of the more than one of the at least one DACs are summed together in analog; and wherein the at least one $S_2 \approx D_{i2}^2$, $S_3 \approx D_{i3}^2$, $S_4 \approx D_{i4}^2$, $S_5 \approx D_{i5}^2$, and $S_6 \approx D_{i6}^2$ signals represent an at least one square approximation of the at least one D.

Another aspects of the embodiments disclosed herein include an approximate digital squaring (a"SQR) method in a digital state machine in an integrated circuit, the method comprising: receiving at least one input digital word ($D_i$), wherein the at least one $D_i$ has a digital value spanning from zero scale (ZS) to full scale (FS); receiving a total number of digital interpolation steps (n); programming a digital state machine to cycle a plurality (j) of steps, wherein the cycle starts at a first step and increments up to n steps; initializing a first digital array (P) to zero scale, wherein the first digital array P is comprised of a plurality of digital words ($P_j$); initializing a second digital array (O) to zero scale; wherein the second digital array O is comprised of a plurality of digital words ($O_j$); looping the digital state machine to perform the following cycle of the plurality (j) of steps: a first step $$O_j = 2 \times \sum_{k=1}^{j-1} P_j + \left(\frac{1}{2}\right)^j \times FS;$$

then save $O_j$ digital word value; next $P_j$=max (ZS, $O_j$); then save $P_j$ digital word value; next if j<n, then increment j by 1 and return to the first step; otherwise if j=n, then exit the loop; after exiting the loop then generating a summation digital word $$S_n = \sum_{j=1}^{n}(P_j \times 1/2^{(j-2)});$$

and wherein $S_n$ is an approximate digital representation of the square of $D_i$ (~$D_i^2$).

Another aspects of the embodiments disclosed herein include an approximate digital multiplication method in a digital state machine in an integrated circuit, the method comprising: operating an at least one digital computation cell (cell Z), the digital cell Z comprising: a pair of digital input ports (Px, Py) for receiving a pair of digital input words (x, y), a pair of digital output ports ($PX_o$, $Py_o$) for outputting a pair of digital output words ($X_o$, $y_o$), and wherein the x and y digital input words can span between a negative full-scale (−FS) and a positive full-scale (+FS); computing each $X_o$ output digital word of the digital cell Z as a function of an f scaled absolute value of a sum of the x digital word plus the y digital word minus the f scaled absolute value of the x digital word minus the y digital word, wherein $$X_o = \frac{|x+y|}{f} - \frac{|x-y|}{f};$$

computing each $y_o$ output digital word of the digital cell z as a function of the f scaled absolute value of a sum of the x digital word plus they digital word plus the f scaled absolute value of the x digital word minus the y digital word minus the +FS, wherein $$y_o = \frac{|x+y|}{f} + \frac{|x-y|}{f} - FS;$$

and wherein $$\frac{1}{2^m} < f < 2^m$$

wherein 0<m<10. Further aspect of the approximate digital multiplication method in a digital state machine in an integrated circuit, the method further comprising: operating a plurality (n) of digital cell Z; programming an interpolating approximate digital multiplier with a plurality of n digital interpolation stages from a first digital interpolation stage i=0 up to a last digital interpolation stage i=n−1, wherein n is a total number of digital interpolation stages, and wherein each interpolation stage comprises at least one digital cell Z; cascading a sequence of n of the digital cell Zs beginning with a first digital cell z in the sequence corresponding to i=0 and ending with a last digital cell Z in the sequence corresponding to i=n−1; the pair of $PX_o$ and $Py_o$ digital output ports of the first cell Z communicating with the respective pair of Px and Py digital input ports of a second cell Z in the sequence corresponding to i=1; the pair of $PX_o$ and $Py_o$ digital output ports of each successive cell Z in the sequence communicating with the respective pair of Px and Py digital input ports of each subsequent successive cell Z in the cascaded sequence of cell Zs; and wherein 1≤n≤10 and 1≤i+1≤10. Further aspect of the approximate digital multiplication method in a digital state machine in an integrated circuit, the method further comprising: receiving a pair of digital input words ($x_{in}$, $y_{in}$) at the Px and Py digital input ports of the first cell Z corresponding to i=0, wherein each $x_{in}$ and the $y_{in}$ digital input word has a digital value spanning from negative full-scale (−FS) to positive full scale (+FS); generating an at least one pair of digital output words ($Xo_{i+1}$ and $yo_{i+1}$) at the $PX_o$ and $Py_o$ digital output ports of the respective $i^{th}$ cell Z in the cascaded sequence of cell Zs; generating an at least one interpolated approximate multiplication digital word ($xy_n$) in an at least one digital cell Z in accordance with at least one of a digital-input to digital-output transfer function $$xy_{i+1} = \sum_{i=0}^{n-1} \frac{1}{2^{2i}} Xo_{i+1},$$

and $$xy_{i+1} = xy_i + \frac{1}{2^{2i}} Xo_{i+1},$$

and wherein $xy_0$=0 for i=0; and wherein the $xy_n$ digital word is an approximate digital product of $x_{in}$ and $y_{in}$, wherein $xy_n$=$xy_{i+1}$≈$x_{in}$×$y_{in}$. Further aspect of the approximate digital multiplication method in a digital state machine in an integrated circuit, the method further comprising: generating an at least another interpolated approximate multiplication digital word ($xy_{nA}$) in an at least one digital cell Z in accordance with at least one of another digital-input to digital-output transfer function $xy_{nA}$=$xy_{(i+1)A}$=$xy_{i+1}$+($Xo_{i+1}$×$yo_{i+1}$)/$2^{2i}$, wherein $$xy_{i+1} = xy_i + \frac{1}{2^{2i}} Xo_{i+1}.$$

Another aspects of the embodiments disclosed herein include an approximate digital multiplication method in a digital state machine in an integrated circuit, the method comprising: operating an at least one digital computation cell (cell Z), the digital cell Z comprising: a pair of digital input ports ($PX_i$, $PY_i$) for receiving a pair of digital input words ($X_i$, $Y_i$), a pair of digital output ports ($PX_{i+1}$, $PY_{i+1}$) for outputting pair of digital output words ($X_{i+1}$, $Y_{i+1}$), wherein the pair of $X_i$ and $Y_i$ digital input words can span between a negative full-scale (−FS) and a positive full-scale (+FS); computing each $X_{i+1}$ output digital word of the digital cell Z as a function of an f scaled absolute value of a sum of the $X_i$ digital input word plus the $Y_i$ digital input word minus the f scaled absolute value of the $X_i$ digital input word minus the $Y_i$ digital input word, wherein $$X_{i+1} = \frac{|X_i + Y_i|}{f} - \frac{|X_i - Y_i|}{f},$$

computing each $Y_{i+1}$ digital output word of the digital cell Z as a function of an f scaled absolute value of a sum of the $X_i$ digital input word plus the $Y_i$ digital input word plus the f scaled absolute value of the $X_i$ digital input word minus the $Y_i$ digital input word minus +FS, wherein $$X_{i+1} = \frac{|X_i + Y_i|}{f} + \frac{|X_i - Y_i|}{f} - FS;$$

and wherein the $$\frac{1}{2^m} < f < 2^m$$

wherein 0<m<10. Further aspect of the approximate digital multiplication method in a digital state machine in an integrated circuit, the method further comprising: receiving a total number of digital interpolation steps (n); programming a digital state machine to cycle a plurality (i) of steps, the cycle starting at a first step corresponding to i=0 and incrementing up to n−1 steps; initializing a first pair of digital output words ($X_0$, $Y_0$) to a zero-scale (ZS), the first pair of $X_0$ and $Y_0$ digital output words belonging to a plurality of pairs of digital output words ($X_{i+1}$, $Y_{i+1}$); initializing a first approximate multiplication digital output word ($xy_0$) to zero scale, wherein the $xy_0$ digital output word belongs to a plurality of approximate multiplication digital output words ($xy_{i+1}$); looping the digital state machine comprising at least one digital cell Z to perform a sequence of a plurality of i steps comprising: starting the loop at a beginning i step; receiving a pair of $X_{i+1}$ and $Y_{i+1}$ digital output words at the pair of $PX_i$ and $PY_i$ digital input ports of the at least one cell Z, wherein the f factor is programmed to a corresponding f of the $i^{th}$ step; generating the pair of $X_{i+1}$ and $Y_{i+1}$ digital output words at the pair of $PX_{i+1}$ and $PY_{i+1}$ digital output ports of the at least one cell Z corresponding to the $i^{th}$ step; generating an $n^{th}=(i+1)^{th}$ interpolated approximate multiplication digital output word ($xy_n$) in the at least one of a plurality of digital cell Zs in accordance with at least one of the digital-input to digital-output transfer functions $$xy_{i+1} = \sum_{i=0}^{n-1} \frac{1}{2^{2i}} X_{i+1},$$

and $$xy_{i+1} = xy_i + \frac{1}{2^{2i}} X_{i+1},$$

and wherein $xy_0=0$ for i=0; updating the pair of $X_{i+1}$ and $Y_{i+1}$ digital output words; updating the $xy_{i+1}$ digital word; incrementing i by 1 if i<n−1, and returning to the beginning step, otherwise exiting the loop if i=n−1; wherein 1≤n≤10; and wherein 1≤i+1≤10. Further aspect of the approximate digital multiplication method in a digital state machine in an integrated circuit, the method further comprising: receiving at least one of a pair of digital input words ($x_{in}$, $y_{in}$) at the pair of $PX_i$ and $PY_i$ digital input ports of another cell Z (cell $Z_1$) wherein the pair of $x_{in}$ and $y_{in}$ digital input words have a digital value spanning from negative full-scale (−FS) to positive full scale (+FS), wherein an f factor of the cell $Z_1$ is programmed to ½ of the f factor of the cell Z; feeding at least one of a pair of an $X_{i+2}$ and $Y_{i+2}$ output digital words of the cell Z and an updated pair of $X_{i+1}$ and $Y_{i+1}$ digital input words of the cell $Z_1$ onto the pair of $PX_i$ and $PY_i$ digital input ports of cell Z; and wherein the $xy_n$ digital word is an approximate digital product of $x_{in}$ and $y_{in}$, and wherein $xy_n=xy_{i+1}\approx x_{in}\times y_{in}$.

Another aspects of the embodiments disclosed herein include an approximate digital squarer method in a digital state machine in an integrated circuit, the method comprising: operating an at least one digital computation cell (cell W), the digital cell W comprising: a digital input port ($PX_i$) for receiving a digital input word ($X_i$), a digital output port ($PX_{i+1}$) for outputting a digital output word ($X_{i+1}$), wherein the $X_i$ digital input word can span between a negative full-scale (−FS) and a positive full-scale (+FS); computing each $X_{i+1}$ output digital word of the digital cell W as a function of an $f_1$ scaled absolute value of the $X_i$ digital input word minus an $f_2$ scaled +FS plus a +FS, wherein $X_{i+1}=f_1\times|X_i-f_2\times FS|+f_3\times FS$; and wherein the $$\frac{1}{2^m} < f_1 \& f_2 \& f_3 < 2^m$$

wherein 0<m<10. Further aspect of the approximate digital squarer method in a digital state machine in an integrated circuit, the method further comprising: receiving a total number of digital interpolation steps (n); programming a digital state machine to cycle a plurality (i) of steps, the cycle starting at a first step corresponding to i=0 and incrementing up to n−1 steps; initializing a first digital output word ($X_0$) to a zero scale (ZS), wherein the first $X_0$ digital output word belonging to a plurality of digital output words ($X_{i+1}$); initializing a first approximate square digital output word ($S_0$) to a zero-scale (ZS), wherein the $S_0$ digital output word belonging to a plurality of approximate square digital output words ($S_{i+1}$); looping the digital state machine comprising the at least one digital cell W to perform a sequence of a plurality of i steps comprising: starting the loop at a beginning i step; receiving a $X_{i+1}$ digital output word at the $PX_i$ digital input port of the at least one cell W; generating the $X_{i+1}$ digital output word at the $PX_{i+i}$ digital output port of the at least one cell W corresponding to the $i^{th}$ step; generating a $n^{th}=(i+1)^{th}$ interpolated approximate square digital output word ($S_n$) in the at least one of the plurality of digital cell Ws in accordance with at least one of digital-input to digital-output transfer functions $$S_{i+1} = \sum_{i=0}^{n-1} \frac{1}{2^{2i}} X_{i+1} + C_{i+1},$$

and $$S_{i+1} = S_i + \frac{1}{2^{2i}} X_{i+1} + C'_{i+1},$$

wherein $S_0=0$ for $i=0$, and wherein $C_{i+1}$ and $C'_{i+1}$ are proportional to +FS; updating the $X_{i+1}$ digital output word at every $i^{th}$ step; updating the $S_{i+1}$ digital word at every $i^{th}$ step; incrementing i by 1 if i<n−1, and returning to the beginning step, otherwise exiting the loop if i=n−1; wherein 1≤n≤10; and wherein 1≤i+1≤10. Further aspect of the approximate digital squarer method in a digital state machine in an integrated circuit, the method further comprising: receiving at least one digital input word ($x_{in}$) at the $PX_i$ digital input port of another cell W (cell $W_1$), wherein the $x_{in}$ digital input word has a digital value spanning from negative full-scale (−FS) to positive full scale (+FS), wherein $f_1=1$, $f_2=1$, and $f_3=0$ for cell $W_1$, and wherein $f_1=2$, $f_2=1.5$, and $f_3=1$ for cell W; feeding at least one of the $X_{i+1}$ digital output word of cell $W_1$, and an updated $X_{i+2}$ digital output word of cell W onto the $PX_i$ digital input port of cell W; and wherein the $S_n$ digital word is an approximate digital square of $x_{in}$, wherein $S_n=S_{i+1}\approx(x_{in})^2$.

BRIEF DESCRIPTION OF THE DRAWINGS

The subject matter presented herein is illustrated by way of example, and not by way of limitation, in the figures of the accompanying drawings and illustrations, and in which like reference numerals refer to similar elements, and in which:

FIG. 1AA is a flow chart illustrating an approximate square method (aSQR) that can be utilized in an asynchronous (clock-free) arrangement.

FIG. 1AAA is a circuit simulation showing the relation between the number of interpolation and the error (i.e., deviation from an ideal square) attributed to the aSQR method (illustrated in FIGS. 1A and 1AA).

FIG. 1BB is the logic block diagram for a 1-bit digital full adder of FIG. 1B.

FIG. 1C is a logic diagram for a 4-bit wide digital full adder, comprised of four of the 1-bit wide full adders disclosed in FIG. 1B and FIG. 1BB.

FIG. 1D is a block diagram of the 4-bit wide full-adder of FIG. 1C.

FIG. 1E is a logic diagram for a 6-bit wide digital full adder, comprised of six of the 1-bit wide full adders disclosed in FIG. 1B and FIG. 1BB.

FIG. 1F is a block diagram of the 6-bit wide full-adder of FIG. 1E.

FIG. 1G is a logic diagram for an 8-bit wide digital full adder, comprised of six of the 1-bit wide full adders disclosed in FIG. 1B and FIG. 1BB.

FIG. 1H is a block diagram of the 8-bit wide full-adder of FIG. 1G.

FIG. 3A is a circuit simulation showing the error (deviation from an ideal square) attributed to the asynchronous digital approximate squarer of FIG. 2A.

DETAILED DESCRIPTION

Figure 1A:
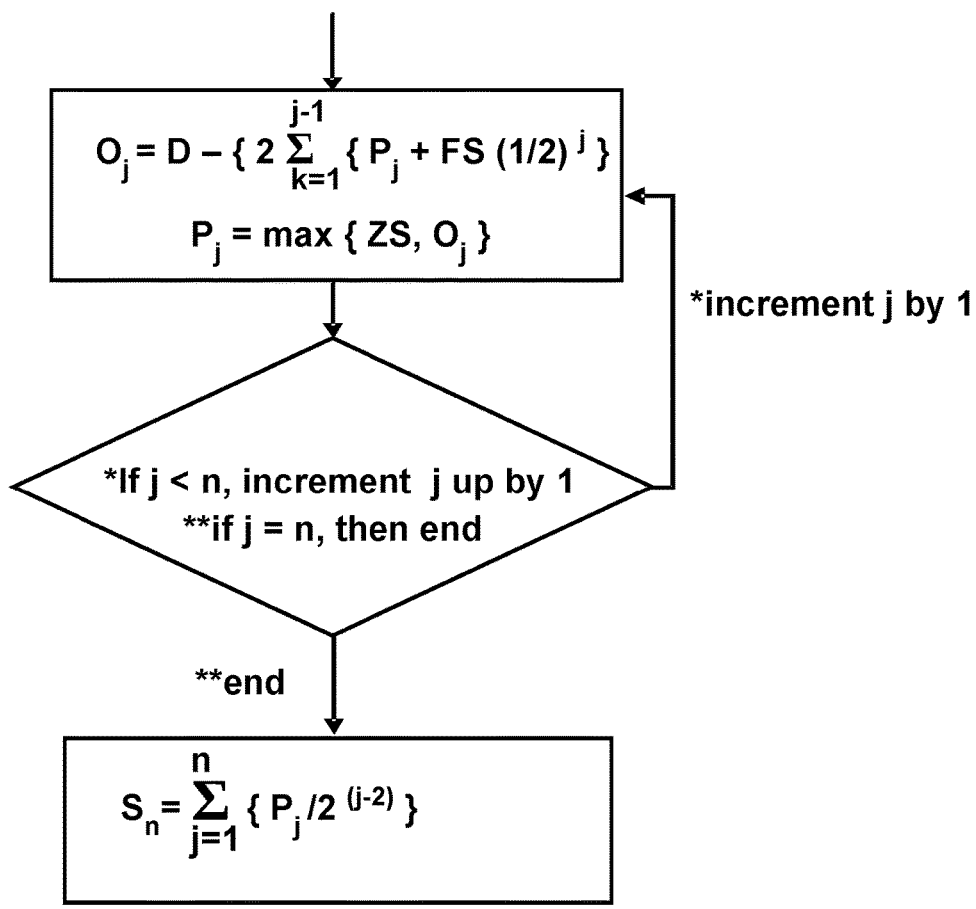
FIG. 1A is a flow chart illustrating an approximate square method (aSQR) that can be utilized in a synchronous arrangement.
Figure 1A:
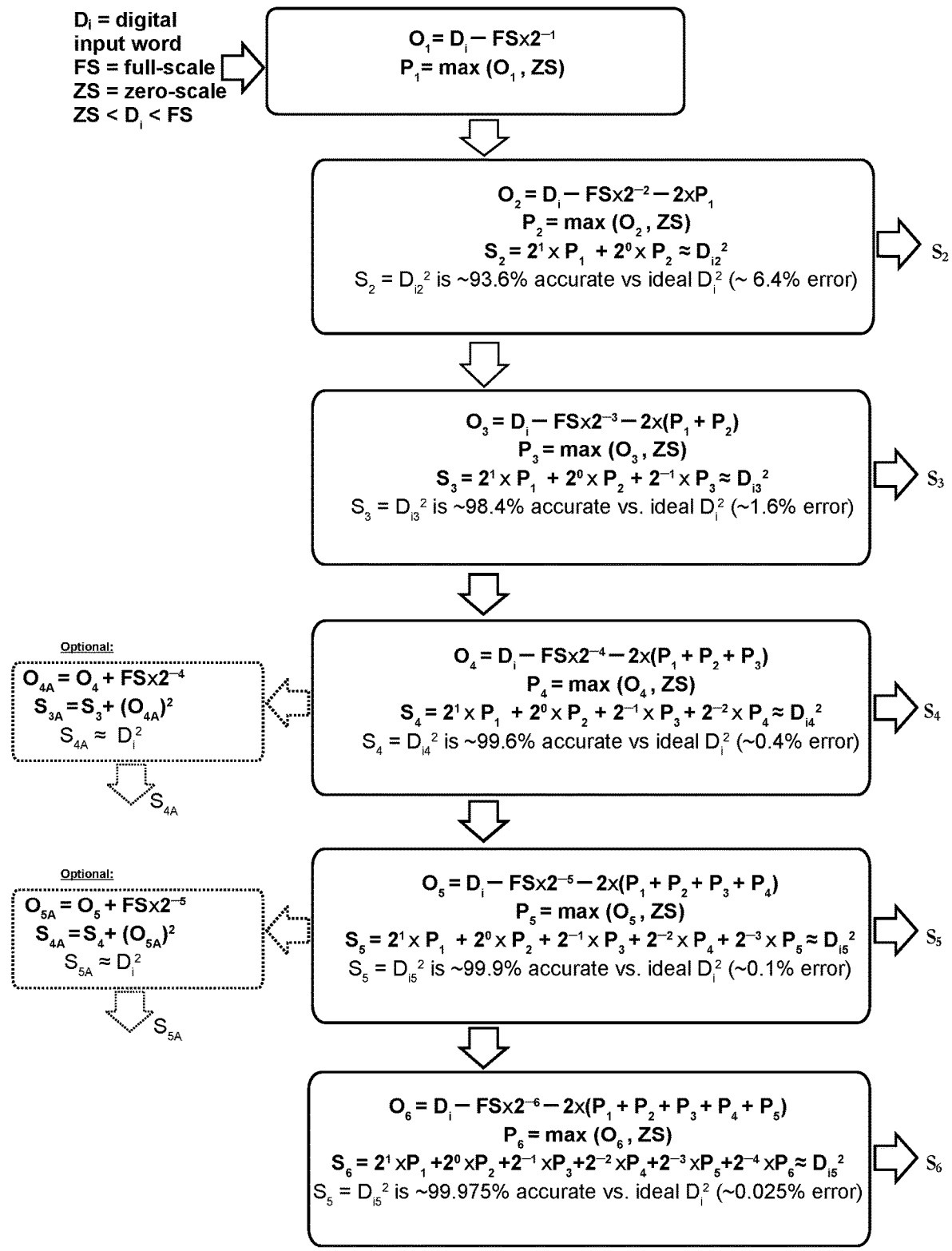

Numerous embodiments are described in the present application and are presented for illustrative purposes only and is not intended to be exhaustive. The embodiments were chosen and described to explain principles of operation and their practical applications. The present disclosure is not a literal description of all embodiments of the disclosure(s). The described embodiments also are not, and are not intended to be, limiting in any sense. One of ordinary skill in the art will recognize that the disclosed embodiment(s) may be practiced with various modifications and alterations, such as structural, logical, and electrical modifications. For example, the present disclosure is not a listing of features which must necessarily be present in all embodiments. On the contrary, a variety of components are described to illustrate the wide variety of possible embodiments of the present disclosure(s). Although particular features of the disclosed embodiments may be described with reference to one or more particular embodiments and/or drawings, it should be understood that such features are not limited to usage in the one or more particular embodiments or drawings with reference to which they are described, unless expressly specified otherwise. The scope of the disclosure is to be defined by the claims.

Although process (or method) steps may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the embodiment(s). In addition, although a process may be described as including a plurality of steps, that does not imply that all or any of the steps are essential or required. Various other embodiments within the scope of the described disclosure(s) include other processes that omit some or all of the described steps. In addition, although a circuit may be described as including a plurality of components, aspects, steps, qualities, characteristics and/or features, that does not indicate that any or all of the plurality are essential or required. Various other embodiments may include other circuit elements or limitations that omit some or all of the described plurality.

Throughout this disclosure, the terms FET is field-effect-transistor; MOS is metal-oxide-semiconductor; MOSFET is MOS FET; PMOS is p-channel MOS; MOS is n-channel MOS; BiCMOS is bipolar CMOS; LSP of a signal is the Least-Significant-Portion of the signal; MSP of the signal is the Most-Significant-Portion of the signal; and the sum of the MSP of the signal plus the LSP of the signals is equal to the whole signal; and the MSP or LSP can be represented in analog or digital form or combination thereof; MSB is Most-Significant-Bit and LSB is Least-Significant-Bit; SPICE is Simulation Program with Integrated Circuit Emphasis which is an industry standard circuit simulation program; micro is µ which is $10^{-6}$; nano is n which is $10^{-9}$; and pico is p which is $10^{-12}$. Bear in mind that $V_{DD}$ (as a positive power supply) and $V_{SS}$ (as a negative power supply) are applied to all the circuitries, blocks, or systems in this disclosure, but may not be shown for clarity of illustrations. The $V_{SS}$ may be connected to a negative power supply or to the ground (zero) potential. Body terminal of MOSFETs can be connected to their respective source terminals or to the MOSFET's respective power supplies, $V_{DD}$ and $V_{SS}$.

Keep in mind that for descriptive clarity, illustrations of the disclosed inventions are simplified, and their improvements beyond simple illustrations would be obvious to one skilled in the arts.

Section 1A—Description of FIG. 1A

FIG. 1A is a flow chart illustrating an approximate square method (aSQR) that can be utilized in a synchronous arrangement. The aSQR method can be implemented utilizing a digital IC state machine in a following manner. With a digital input word $D_i$ that spans from zero scale=ZS to full scale=FS the digital IC state machine arranged in accordance with the aSQR method can generate a digital word $S_n$ which is an approximate square representation of $D_i$. The precision (i.e., the degree of squarer approximation) of $S_n$ can be pre-programmed or programmed into the digital IC state machine in real-time (on the fly) by n interpolations. Keep in mind that the aSQR method utilizing six interpolations here is for illustrative simplicity, and not as a limitation of the aSQR method that can accommodate higher interpolation (n >6) which will result in higher precision. Intermediate digital words $O_j$ and $P_j$ are generated, via the digital IC state machine, in a sequence of n-cycles as follows:

$$O_j = Di - \sum_{k=1}^{j-1} 2P_j - FS/2^j$$

wherein j loops-up to n times and wherein $P_j=|O_j|+O_j/2$. The generated $P_j$ are scaled binarily sequentially and added together according to $$S_n = \sum_{j=1}^{n} P_j/2^{(j-2)}.$$

In section A1' and FIG. 1AAA the precision of an approximate squarer's digital IC (arranged asynchronously in accordance with the aSQR method) as a function of n will be described in more detail. Also, section A1' will describes the flexibility of increasing the precision of the aSQR method by combining it with a conventional multiplier function at the tail end of the interpolation chain.

Some of the benefits of the aSQR method, operating in synchronous mode, are summarized below:

First, the aSQR method enables a digital IC state machine to perform on-the fly or pre-programming of precision versus power consumption, and speed of an approximate squarer. The lower the precision requirement, the faster the squaring and the lower the power consumption per the squaring operation. As such, the precision of squarer approximation can be traded off with cost, speed, and power consumption depending on application cots-performance objectives.

Second, relatively speaking while addition (subtraction) occupies a large area in the digital domain, a digital IC state machine arranged in accordance with the disclosed aSQR method utilizes fewer adders compared to conventional digital IC squarers. Instead, the disclosed aSQR method requires functions such as multiply or divide by two, that can be implemented by a simple shift to the right or left in the digital domain, which takes a small die area. Moreover, the aSQR method utilizes functions such as adding or subtracting a fixed digital value (in proportion to an input digital word's full scale), which also take a relatively small area.

Third, the disclosed digital IC approximate squaring can be arranged to perform approximate multiplication by utilizing the quarter square algorithm. Accordingly, digital IC multiplication can be performed by deducting the square of subtraction of two digital words (x, y) from the square of their summation as in $(x+y)^2+(x-y)^2=4xy$.

Fourth, the disclosed digital IC approximate squaring can be arranged to performed square and accumulate (SAC) and multiply and accumulate (MAC) functions in pure digital and or mixed-mode. For example, plurality of digital outputs of approximate digital IC squarers or approximate digital IC multipliers can be inputted to plurality of current mode Digital-to-Analog-Converters (iDAC), wherein the function of summation (e.g., adding two multiplications) can be performed simply by coupling together the current output terminals of plurality of iDACs.

Fifth, there is the option and flexibility to increase the precision of the aSQR method substantially by combining it with a conventional multiplier function at the tail end of the interpolation chain.

Section 1AA—Description of FIG. 1AA

FIG. 1AA is a flow chart and a functional block diagram illustrating an approximate square method (aSQR) that can be utilized in an asynchronous (clock-free) arrangement. In a digital squarer IC that is arranged in accordance with the aSQR method, a digital word $D_i$ can be approximately squared ($D_i^2 \approx \sim S_n$) through a series (n) of interpolation (without a clock), wherein the accuracy of the $D_i^2 \approx \sim S_n$ digital word can be increased with more n interpolations. For example, two interpolations generate an approximate squared digital word $S_2$ whereas n>2 interpolations generate an approximate squared digital word $S_n$, wherein $S_2$ is less precise than $S_n$. Generally speaking, the less the interpolations (small n), the less the precision of the approximate square results. But fewer interpolations can be done faster with less power consumption and less logic gate count (cheaper). This feature of the aSQR method would enable the end application to pre-program and optimize the approximate squaring function in accordance with cost-performance objectives. As noted earlier, for cost sensitive applications the aSQR method can be utilized synchronously where an approximate squarer digital IC cell block can be re-used in a time-multiplexed loop through a sequence of cycles (i.e., n-times). Conversely, for speed sensitive applications, the aSQR method can be utilized asynchronously (clock-free) through a series of n interpolations implemented in combinational logic. Keep in mind that the aSQR method utilizing six interpolations here is for illustrative simplicity, and not as a limitation of the aSQR method that can accommodate higher interpolation (n >6) which will result in higher precision. In the proceeding description, note that the range of the $D_i$ digital word is from zero-scale (ZS) with all zero bits to full-scale (FS) with all one bit.

In FIG. 1AA the respective series of n asycnhronous interpolations, based on the aSQR method, are described:

In the first interpolation (n=1), the $D_i$ word is shifted by half of full-scale (FS/2) to arrange a digital word $O_1$ which is a $D_i$ word that is digitally offset by FS/2. As such, $O_1 = D_i - FS \times 2^{-1}$. Then, a maximum of the $O_1$ word and zero-scale is selected that outputs a $P_1$ digital word $P_1 = \max(O_1, ZS)$. Accordingly, the digital $P_1$ word represents the maximum portion of the $D_i$ word above FS/2.

In the second interpolation (n=2) stage, the $D_i$ word is shifted by a sum of $2 \times P_1$ word and a quarter of full-scale to generate a digital word $O_2$ which is a $D_i$ word that is offset down by $FS \times 2^{-2} + 2 \times P_1$. That is to say $O_2 = D_i - (FS \times 2^{-2} + 2 \times P_1)$. Then, a maximum of the digital $O_2$ word and zero-scale is selected that generates a digital $P_2$ word which is a positive word with respect to zero-scale or $P_2 = \max(O_2, ZS)$. Accordingly, the digital $P_2$ word represents the positive portion of the $D_i$ word above the sum of FS/4 and $2 \times P_1$ word. Here at the second interpolation point, an approximate squared digital word $S_2 = D_{i2}^2$ (that is an approximate representation of the square of the digital $D_i$ word) is be generated by summing the binarily scaled digital $P_1$ and $P_2$ words. Stated mathematically, $D_i^2 \approx S_2 = D_{i2}^2 = 2^1 \times P_1 + 2^0 \times P_2$. As depicted in FIG. 1AAA, notice that with two interpolations (n=2) the $S_2 = D_{i2}^2$ word is ~93.6% accurate as compared to ideal $D_i^2$ (with ~6.4% error).

If a squarer with greater than 93.6% of precision is required, another interpolation (n=3) can be implemented in accordance to the aSQR method. In the third interpolation stage, the $D_i$ word is shifted by a sum of $2 \times (P_1 + P_2)$ word and one eighth of full-scale (FS/8) to generate a digital word $O_3$ which is a $D_i$ word that is offset by $FS \times 2^{-3} + 2 \times (P_1 + P_2)$. That is to say $O_3 = D_i - \{FS \times 2^{-3} + 2 \times (P_1 + P_2)\}$. Then, the maximum of the $O_3$ word and zero-scale (ZS) is selected which generates a $P_3$ word that is a positive word with respect to ZS or $P_3 = \max(O_3, ZS)$. Accordingly, the $P_3$ word represents the positive portion of the $D_i$ word above the sum of FS/8 and $2 \times (P_1 + P_2)$ word. Here at the third interpolation point, an approximate squared digital word $S_3 = D_{i3}^2$ (that is an approximate representation of the square of the $D_i$ word) is be generated by summing the binarily proportioned $P_1$, $P_2$, and $P_3$ words. Stated mathematically, $D_i^2 \approx S_3 = D_{i3}^2 = 2^1 \times P_1 + 2^0 \times P_2 + 2^{-1} \times P_3 \approx D_{i3}^2$. As depicted in FIG. 1AAA, notice that with three interpolations (n=3) the $S_3 = D_{i3}^2$ word is ~98.4% accurate as compared to ideal $D_i^2$ (with ~1.6% error).

When a squarer with greater than 98.4 of precision is required, another interpolation (n=4) can be implemented in accordance to the aSQR method. In the fourth interpolation stage, the $D_i$ word is shifted by a sum of $2 \times (P_1 + P_2 + P_3)$ word and one sixteenth of full-scale (FS/16) to arrange a digital word $O_4$ which is a $D_i$ word that is offset by $FS \times 2^{-4} + 2 \times (P_1 + P_2 + P_3)$. Put differently, $O_4 = D_i - \{FS \times 2^{-4} + 2 \times (P_1 + P_2 + P_3)\}$. Then, a maximum of the $O_4$ word and zero-scale is selected that generates a $P_4$ word which is a positive word with respect to ZS or $P_4 = \max(O_4, ZS)$. Accordingly, the $P_4$ word represents the positive portion of the $D_i$ word above the sum of 1/16 of FS and $2 \times (P_1 + P_2 + P_3)$ word. Here again at the fourth interpolation point, an approximate squared digital word $S_4 = D_{i4}^2$ (that is an approximate representation of the square of the $D_i$ word) is be generated by summing binarily proportioned $P_1$, $P_2$, $P_3$, and $P_4$ words. Stated mathematically, $D_i^2 \approx S_4 = D_{i4}^2 = 2^1 \times P_1 + 2^0 \times P_2 + 2^{-1} \times P_3 + 2^{-2} \times P_4$. As depicted in FIG. 1AAA, notice that with four interpolations (n=4) the $S_4 = D_{i4}^2$ word is ~99.6% accurate as compared to ideal $D_i^2$ (with ~0.4% error).

Again, if an approximate squarer with higher precision than 0.4% (accurate to ~8-bits) is required, another interpolation (n=5) can be implemented in accordance to the aSQR method. As such, the $D_i$ word can be shifted by a sum of $2 \times (P_1 + P_2 + P_3 + P_4)$ words and 1/32 of full-scale (FS/32) to arrange a digital word $O_5$ which is a $D_i$ word that is offset by $FS \times 2^{-5} + 2 \times (P_1 + P_2 + P_3 + P_4)$. Said differently, $O_5 = D_i - \{FS \times 2^{-5} + 2 \times (P_1 + P_2 + P_3 + P_4)\}$. Then, a maximum of the $O_5$ word and ZS is selected that generates a $P_5$ word which is a positive word with respect to ZS or $P_5 = \max(O_5, ZS)$. Accordingly, the $P_5$ word represents the positive portion of the $D_i$ word above the sum of FS/32 and $2 \times (P_1 + P_2 + P_3 + P_4)$ word. Here again, an approximate squared digital word $S_5 = D_{i5}^2$ can be arranged by summing binarily proportioned $P_1$, $P_2$, $P_3$, $P_4$, and $P_5$ words, wherein $S_5 = D_{i5}^2$ word is an approximate representation of the square of the $D_i$ word. Stated mathematically, $D_i^2 \approx S_5 = D_{i5}^2 = 2^1 \times P_1 + 2^0 \times P_2 + 2^{-1} \times P_3 + 2^{-2} \times P_4 + 2^{-3} \times P_5$. As depicted in FIG. 1AAA, with five interpolations (n=5), observe that $S_5 = D_{i5}^2$ word is ~99.9% accurate as compared to ideal $D_i^2$ (with ~0.1% error).

Similarly, if an approximate squarer with better than ~0.1% precision (accuracy of ~10-bits) is needed, another interpolation (n=6) can be implemented in accordance to the aSQR method. As such, the $D_i$ word is shifted by a sum of $2 \times (P_1 + P_2 + P_3 + P_4 + P_5)$ words and 1/64 of full-scale (FS/64) to arrange a digital word $O_6$ which is a $D_i$ word that is offset by $FS \times 2^{-6} + 2 \times (P_1 + P_2 + P_3 + P_4 + P_5)$. Stated differently, $O_6 = D_i - \{FS \times 2^{-6} + 2 \times (P_1 + P_2 + P_3 + P_4 + P_5)\}$. Then, a maximum of the $O_6$ word and ZS is selected that generates a $P_6$ word which is a positive word with respect to ZS or $P_6 = \max(O_6, ZS)$.

Accordingly, the $P_6$ word represents the positive portion of the $D_i$ word above the sum of $\frac{1}{64}$ of FS and $2 \times (P_1+P_2+P_3+P_4+P_5)$ words. Here again at the sixth interpolation point, an approximate squared digital word $S_6 = D_{i6}^2$ (that is an approximate representation of the square of the $D_i$ word) is be generated by summing binarily proportioned $P_1$, $P_2$, $P_3$, $P_4$, and $P_5$ words. Stated mathematically, $D_i^2 \approx S_5 = D_{i5}^2 = 2^1 \times P_1 + 2^0 \times P_2 + 2^{-1} \times P_3 + 2^{-2} \times P_4 + 2^{-3} \times P_5 + 2^{-4} \times P_6$. As depicted in FIG. 1AAA, with six interpolations (n=6), observe that $S_6 = D_{i6}^2$ word is ~99.975% accurate as compared to ideal $D_i^2$ (with ~0.025% error). Notice that if an approximate squarer with better than ~0.025% precision (accuracy of ~12-bits) is needed, then more interpolation (n >6) can be implemented in accordance to the aSQR method.

There is an option of increasing precision of the aSQR method by combining it with a conventional squarer at the tail end of the interpolation chain and here is how: The precision of $D_i$ approximate squaring can be increase from $S_i$ to $S_{iA}$ by summing the $S_i$ term to a $(O_{(i+1)A})^2$, wherein $O_{(i+1)A} = O_{i+1} + FS/2^i$ at the tail-end of interpolation chain. With more interpolation down the interpolative cascade the width of the intermediate digital words gets smaller. Conventional squarers generally occupy substantially smaller area when squaring smaller bit-width (e.g., 2-bit or 3-bit digital squarer can be arranged with much smaller gate count than a 6-bit bit squarer), and a divide by 2 digital function requires a simple bit shift-right in a shift register which is also small. Hence, the digital implementation of $(O_{(i+1)A})^2$ can occupy a small gate count down the interpolation chain. Accordingly, the increased gate count area attributed to utilizing a conventional squarer at the tail-end, may be worth the increase in precision of approximate squaring and provide additional cost-performance flexibility in accordance with different application requirements. For example, in FIG. 1AA, $O_{4A} = O_4 + FS/2^4$, $S_{3A} = S_3 + (O_{4A})^2$ wherein the precision of $S_{4A}$ is substantially higher than the precision of $S_4$. Similarly, $O_{5A} = O_5 + FS/2^5$, $S_{4A} = S_4 + (O_{5A})^2$ wherein the precision of $S_{5A}$ is substantially higher than the precision of $S_5$.

In summary, some of the benefits of utilizing the aSQR method in an approximate asynchronous squarer are as follows:

First, conventional digital squarers require many full adders which occupy large areas, generally speaking. The aSQR method can be implemented in the digital domain with fewer adders (compared to a conventional digital squarer) which makes it more area efficient.

Second, implementing the aSQR method requires a number multiply or divide by two operations which can be implemented inexpensively in the digital domain by a shift right or left operation, respectively.

Third, utilizing the aSQR method having more interpolations, the peak-to-peak digital value of sequential $P_i$ digital words diminish, which can help reduced the overall logic gate-count of its implementation.

Fourth, the aSQR method generates a number of points (i.e., digital words) that exactly fit the square function, and it linearly interpolates in-between those points. The larger the number of interpolations (n), the greater the number of points that exactly fit an ideal square function and thus the less the error associated with linearly interpolating in between those exact fit points.

Fifth, fewer gates in a digital circuit generally go hand-in-hand with lower dynamic power consumption and faster speed. As such, since the aSQR method requires fewer gates for implementing a square function, it can function with higher speed and lower dynamic power consumption compared to a convocational digital IC squarer implementation, for a given resolution.

Sixth, there is the option and flexibility to increase the precision of the aSQR method substantially by combining it with a conventional multiplier function at the tail end of the interpolation chain.

Seventh, the disclosed digital IC approximate squaring can be arranged to perform approximate multiplication by utilizing the quarter square method. Accordingly, digital IC multiplication can be performed by deducting the square of subtraction of two digital words (x, y) from the square of their summation as in $(x+y)^2 + (x-y)^2 = 4xy$.

Eight, the disclosed digital IC approximate squaring can be arranged to performed square and accumulate (SAC) and multiply and accumulate (MAC) functions in mixed-mode. For example, plurality of outputs of approximate squarer ICs or approximate multiplier ICs can be inputted to plurality of current mode Digital-to-Analog-Converters (iDACs), wherein by the function of summation (e.g., adding two multiplications) can be performed simply by coupling together the current output terminals of plurality of iDACs.

Section 1AAA—Description of FIG. 1AAA

FIG. 1AAA is a circuit simulation showing the relation between the number of interpolation and the error (i.e., deviation from ideal) attributed to the aSQR method of FIGS. 1A and 1AA. Bear in mind that the illustrated simulations here is intended to further clarify the disclosed aSQR method and not as a limitation on the performance of the disclosed aSQR method.

The horizontal axis shows the digital input word Di spanning from zero scale (ZS) at zero milli-seconds (ms) to full scale (FS) at 10 ms.

The vertical axis shows the percent (%) of inaccuracy of the squarer approximation ($S_2$ to $S_6$) as compared to an ideal square ($D_i^2$).

Bear in mind that for sake of clarity (e.g., avoid overlapping graphs), some of the error waveforms in the upper and lower graphs of FIG. 1AAA are added an artificial offset.

The lower part of FIG. 1AAA depicts simulated precision of aSQR method with n=2 interpolation having an error of about 6.4% for $S_2 - Di^2$ (offset by 0.4%), with n=3 interpolation having an error of about 1.6% for $S_3 - Di^2$ (offset by 0.2%), and with n=4 interpolation having an error of about 0.4% for $S_4 - Di^2$.

The upper part of FIG. 1AAA depicts simulated precision of aSQR method with n=5 interpolation having an error of about 0.1% for $S_5 - Di^2$ (offset by 0.01%), and with n=6 interpolation having an error of about 1.6% for $S_3 - Di^2$ (offset by 0.2%).

Figure 1B:
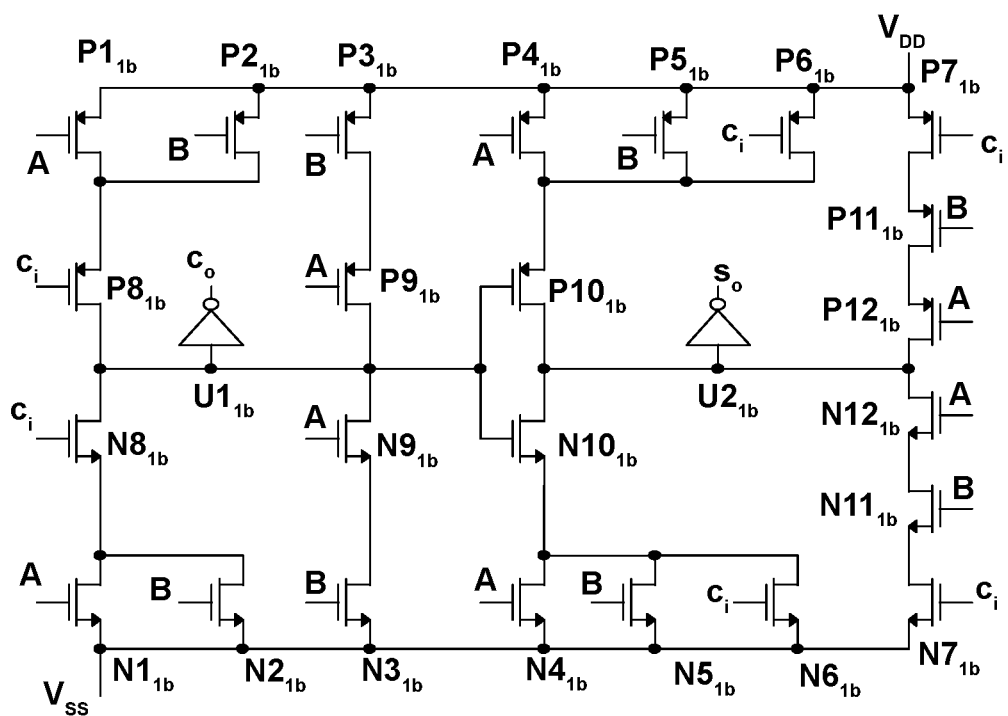
FIG. 1B is a circuit schematic for a 1-bit digital full adder.
Figure 1B:
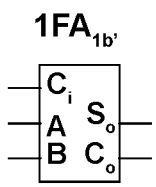

Section 1B & 1BB—Description of FIGS. 1B & 1BB

FIGS. 1B and 1BB are transistor level and block diagram for a 1-bit full adder digital cell, respectively.

The A and B are 1-bit wide digital input ports, $C_i$ is the carry-in 1-bit port, $S_o$ is the summation output 1-bit port, and $C_o$ is the carry-out 1-bit port.

Section 1C & 1D—Description of FIGS. 1C & 1D

FIG. 1C is a logic diagram for a 4-bit wide full adder digital cell, comprised of four of the 1-bit wide full adders disclosed in FIG. 1B and FIG. 1BB. FIG. 1D is a block diagram of the 4-bit wide full-adder of FIG. 1C.

The a1 through a4 (a1: a4) are the first 4-bit wide input port and b1 to b4 (b1: b4) are the second 4-bit wide input port of the 4-bit wide full adder of FIG. 1C and FIG. 1D. The q1 to q4 (q1: q4) are the 4-bit wide output port, Ci is the carry-in 1-bit port, and Co is the carry-out 1-bit port of the 4-bit full adder of FIG. 1C and FIG. 1D.

Section 1E & 1F—Description of FIGS. 1E & 1F

FIG. 1E is a logic diagram for a 6-bit wide full adder digital cell, comprised of six of the 1-bit wide full adders disclosed in FIG. 1B and FIG. 1BB. FIG. 1F is a block diagram of the 6-bit wide full-adder of FIG. 1E.

The a1 through a6 (a1: a6) are the first 6-bit wide input port and b1 to b6 (b1: b6) are the second 6-bit wide input port of the 6-bit wide full adder of FIG. 1E and FIG. 1F. The q1 through q6 (q1: q6) are the 6-bit wide output port, Ci is the carry-in 1-bit port, and Co is the carry-out 1-bit port of the 6-bit full adder of FIG. 1E and FIG. 1F.

Section 1G & 1H—Description of FIGS. 1G & 1H

FIG. 1G is a logic diagram for an 8-bit wide digital IC full adder, comprised of six of the 1-bit wide full adders disclosed in FIG. 1B and FIG. 1BB. FIG. 1H is a block diagram of the 8-bit wide full-adder of FIG. 1G.

The a1 through a8 (a1: a8) are the first 8-bit wide input port and b1 through b8 (b1: b8) are the second 8-bit wide input port of the 8-bit wide full adder of FIG. 1G and FIG. 1H. The q1 through q8 (q1: q8) are the 8-bit wide output port, Ci is the carry-in 1-bit port, and Co is the carry-out 1-bit port of the 8-bit full adder of FIG. 1G and FIG. 1H.

Figure 2A:
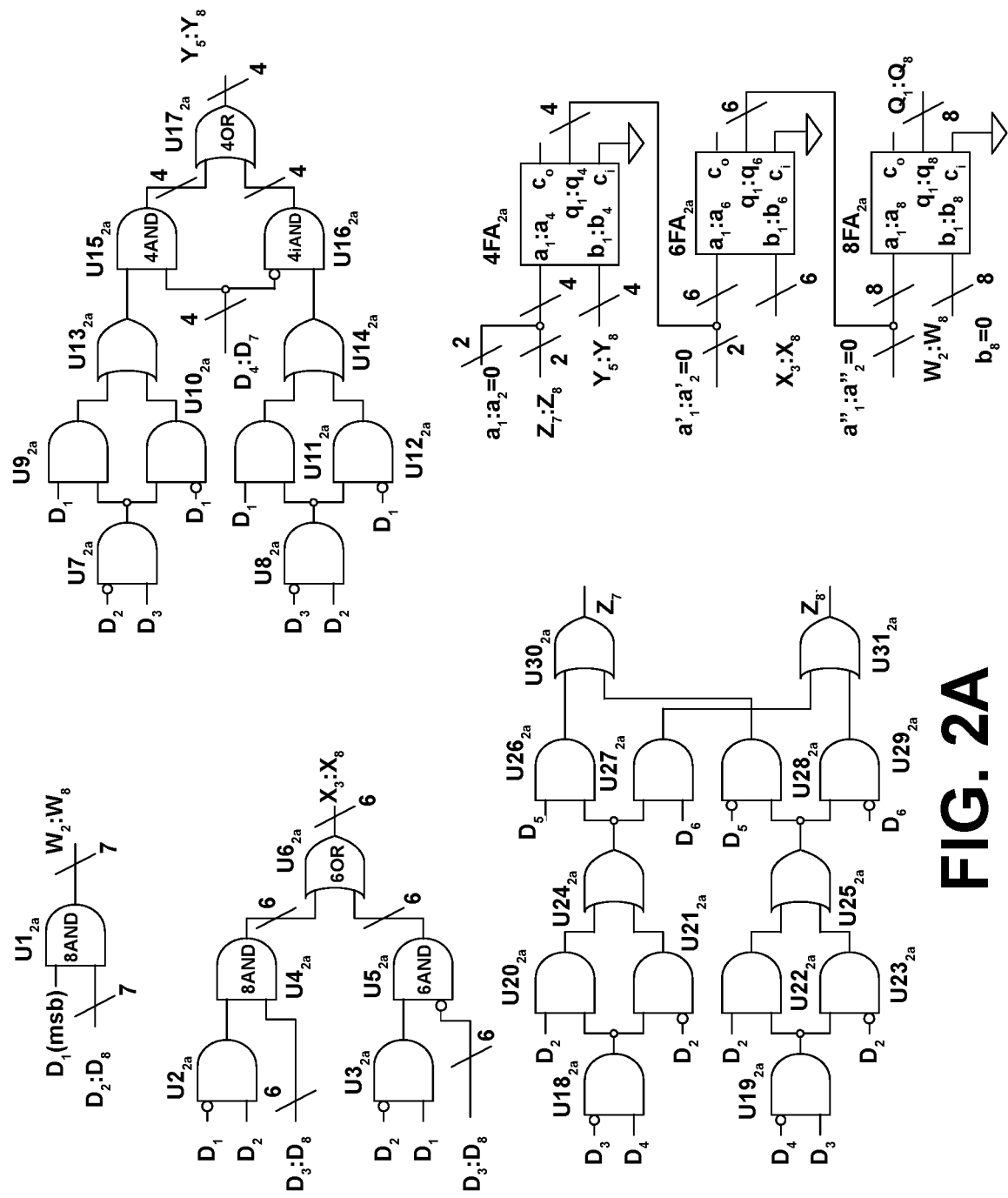
FIG. 2A is a simplified asynchronous combinational logic embodiment of the aSQR method.

Section 2A—Description of FIG. 2A

FIG. 2A is a simplified asynchronous combinational logic embodiment of the aSQR method.

Here, the digital input word Di is an 8-bit wide word (D1: D8) where D1 is the Most-Significant-Bit (MSB) and D8 is the Least-Significant-bit (LSB).

In the asynchronous embodiment of aSQR method depicted in FIG. 2A, the MSB (D1) is gated with eight AND gates ($U1_{2a}$) to generate W2: W8 which is a 7-bit digital word equivalent to the P1 digital word of FIG. 1AA.

The D1/$\overline{D1}$ and D2/$\overline{D2}$ bits are inputted to a combinational logic (comprised of $U2_{2a}$, and $U3_{2a}$) to control the D3: D8 and $\overline{D3}$: $\overline{D8}$ bits through a pair of six AND gates ($U4_{2a}$, and $U5_{2a}$). The digital outputs of $U4_{2a}$, and $U5_{2a}$, are added by six OR gates ($U6_{2a}$) to generate X3: X8 which is a 6-bit word, equivalent to the P2 of digital word FIG. 1AA.

The D1/$\overline{D1}$, D2/$\overline{D2}$, and D3/$\overline{D3}$ bits are inputted to a combinational logic (comprised of $U7_{2a}$, through $U14_{2a}$) to control the D4: D7 and $\overline{D4}$:$\overline{D7}$ bits through a pair of four AND gates ($U15_{2a}$, and $U16_{2a}$). The digital outputs of $U15_{2a}$, and $U16_{2a}$, outputs are added by six OR gates ($U17_{2a}$) to generate Y5: Y8 which is a 4-bit word, equivalent to the P3 digital word of FIG. 1AA.

The D1/$\overline{D1}$, D2/$\overline{D2}$, and D3/$\overline{D3}$ bits are inputted to a combinational logic (comprised of $U7_{2a}$, through $U14_{2a}$) to control the D4: D7 and $\overline{D4}$:$\overline{D7}$ bits through a pair of four AND gates ($U15_{2a}$, and $U16_{2a}$). The digital outputs of $U15_{2a}$, and $U16_{2a}$, are added by six OR gates ($U17_{2a}$) to generate Y4: Y8 which is a 4-bit word, equivalent to the P3 digital word of FIG. 1AA.

The D2/$\overline{D2}$, D3/$\overline{D3}$, D4/$\overline{D4}$, D5/$\overline{D5}$, and D6/$\overline{D6}$ bits are inputted to a combinational logic (comprised of $U18_{2a}$, through $U32_{2a}$) to generate Z7:Z8 which is a 2-bit word, equivalent to the P4 digital word of FIG. 1AA.

The 4-bit full adder $4FA_{2a}$ adds the 2-bit wide digital word Z7:Z8 (with proper scaling via programming a1:a2=0) to the 4-bit wide Y5: Y8 digital word. Then, the Q1:Q4 four-bit wide digital output word of $4FA_{2a}$ (with proper scaling by programming a1': a2'=0) is added the 6-bit wide digital word X3:X8 through the 6-bit full adder $6FA_{2a}$. Next, the Q1:Q6 six-bit wide digital output word of $6FA_{2a}$ (with proper scaling via arranging a1": a2"=0) is added the 8-bit wide digital word W2: W8 (with b8=0) through the 8-bit full adder $8FA_{2a}$.

The 8-bit digital output word Q1: Q8 of $8FA_{2a}$ represents the equivalent to the S4 digital word of FIG. 1AA.

The SPICE simulation of digital circuit in FIG. 2A illustrates the precision of the approximation of the squarer method or aSQR, which is depicted in FIG. 3A and described next in section 3A.

It is obvious to one skilled in the art that other combination logic designs can be implemented in accordance with the aSQR method. Moreover, it is known by those skilled in the arts that for asynchronous logic, alternative digital IC embodiments (e.g., flip-flops, clocked latches, etc.) may be utilized to prevent (e.g., adder output, etc.) glitches due to intermediate digital signal rippling through the stages of digital IC logic paths. Also, keep in mind that for clarity of illustration of FIG. 2A is kept to a simple combinational logic design that does not show details such as fan-in, fan-out, and equalized delay paths.

The benefits of approximate squarer summarized in sections 1A and 1AA are also applicable here to FIG. 2A.

Section 3A—Description of FIG. 3A

FIG. 3A is a circuit simulation showing the error (deviation from an ideal squarer) attributed to the asynchronous approximate squarer of FIG. 2A with four interpolations. Bear in mind that the illustrated simulations here are intended to further clarify the disclosed aSQR method and do not limit the disclosed aSQR method.

The horizontal axis shows the digital input word Di spanning from zero scale (ZS) at zero milli-seconds (ms) to full scale (FS) at 50 µs.

The vertical axis shows the percent (%) of inaccuracy of the asynchronous squarer of FIG. 2A with four interpolations ($S_4$) as compared to an ideal square ($D_i$) indicating an error of about 0.4% for $S_4-Di^2$, which is constant with simulation results depicted in lower graph of FIG. 1AAA for $S_4-Di^2$.

Figure 4A:
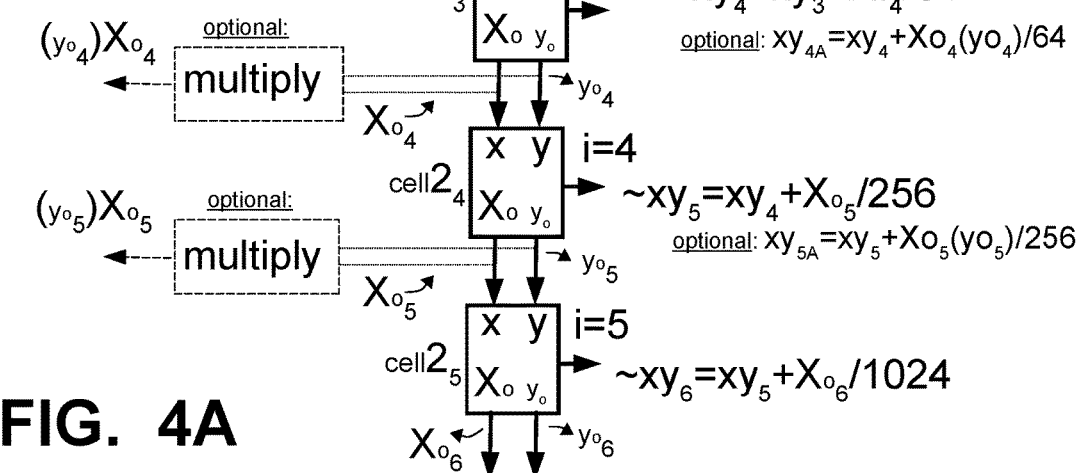
FIG. 4A is a simplified functional block diagram illustrating an approximate multiplier method (aMULT) that can be utilized in a digital asynchronous (clock-free) multiplier IC.

Section 4A—Description of FIG. 4A

FIG. 4A is a simplified functional block diagram illustrating an approximate multiplier method (aMULT) that can be utilized in a digital asynchronous (clock-free) multiplier IC.

In a digital multiplier IC that is arranged in accordance with the aMULT method, a pair of digital input words $x_{in}$ and $y_{in}$ can be approximately multiplied ($\sim xy_i \approx x_{in} \times y_{in}$) through a series of interpolation (n) asynchronously (i.e., without a clock), wherein the accuracy of the $\sim xy_i$ digital word multiplication results can be increased with more interpolations (n). For example, n=2 interpolations generate an approximate multiplication digital word $\sim xy_2$ whereas n=4 interpolations generate an approximate multiplication digital word ~$xy_4$, wherein ~$xy_2$ is less precise multiplication result than ~$xy_4$. Generally speaking, the less the interpolations (fewer n), the less the precision of the approximate multiplication results. But fewer interpolations can be done faster with less power consumption and less logic gate count (i.e., cheaper IC). This feature of the aMULT method would enable the end application to pre-program and optimize the approximate multiplication function in accordance with the end application cost-performance objectives. As noted earlier, for cost sensitive applications the aMULT method can be utilized synchronously where an approximate multiplication digital IC cell block (e.g., cell 2) is re-used in a digital time-multiplexed loop in a sequence of cycles (i.e., n-times). Conversely, for speed sensitive applications, the aMULT method can be utilized asynchronously (clock-free) through a cascaded series of n interpolations implemented in combinational logic. In the proceeding description, note that the range of the $x_{in}$ and $y_{in}$ digital words is from negative full-scale (-FS) which can be all zero-bits to positive full-scale (+FS) which can be all one-bits. Keep in mind that the aMULT method utilizing six interpolations here is for illustrative clarity, and not as a limitation of the aMULT method that can accommodate higher interpolation (n >6) which will result in higher precision.

With the first interpolation (n=1), the $x_{in}$ and $y_{in}$ digital input words are inputted to a combinational logic block Cell 1 which generates digital output words $Xo_1$ and $yo_1$. The digital output words $Xo_1$ and $yo_1$ are functions of the $x_{in}$ and $y_{in}$ digital input words, in accordance to the following digital-input to digital-output transfer functions of Cell 1:

$$Xo_1 = x_o = \frac{|x_{in} + y_{in}|}{2} - \frac{|x_{in} + y_{in}|}{2}$$

and $$yo_1 = y_o = \frac{|x_{in} + y_{in}|}{2} + \frac{|x_{in} + y_{in}|}{2} - FS.$$

The first approximate digital multiplication in Cell 1 is generated in accordance with the mathematical transfer function $$\sim xy_{i+1} = xy_i + \frac{Xo_{i+1}}{2^{2i}}$$

or $$\sim xy_{i+1} = \sum_{i=0}^{n-1} \frac{Xo_{i+1}}{2^{2i}}.$$

The Cell 1's first interpolation at i=0 (n=1) and by programming $xy_0$=0, then $$\sim xy_{0+1} = xy_0 + \frac{Xo_{0+1}}{2^{2 \times 0}} \Rightarrow \sim xy_1 = \frac{Xo_1}{2^0} = Xo_1.$$

Figure 6A:
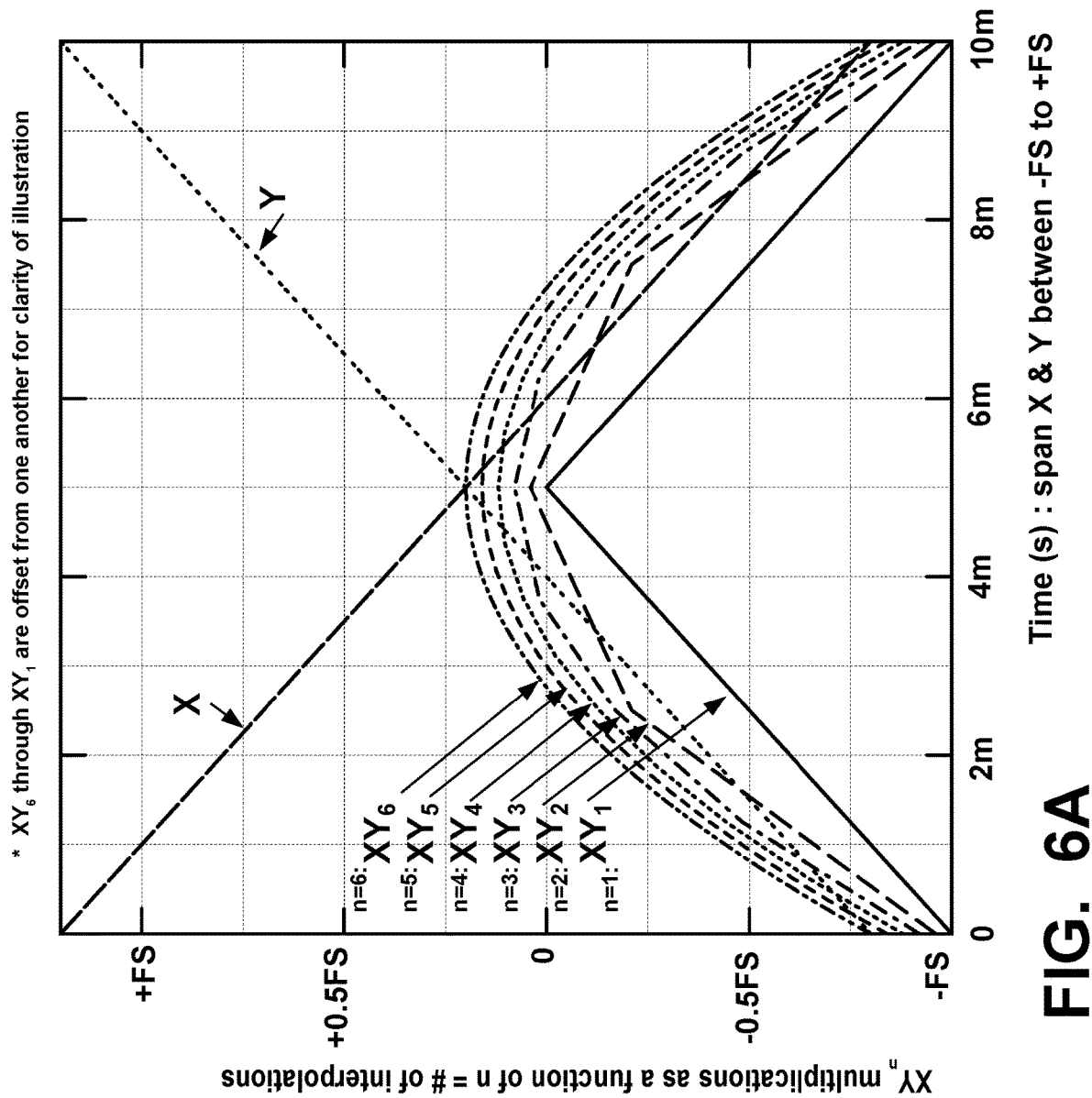
FIG. 6A is simulation of a circuit's behavioral model, utilizing the aMULT method (illustrated in FIGS. 4A and 5A), that shows a plurality of multiplication waveforms $XY_n$ as a function of n interpolations.
Figure 7A:
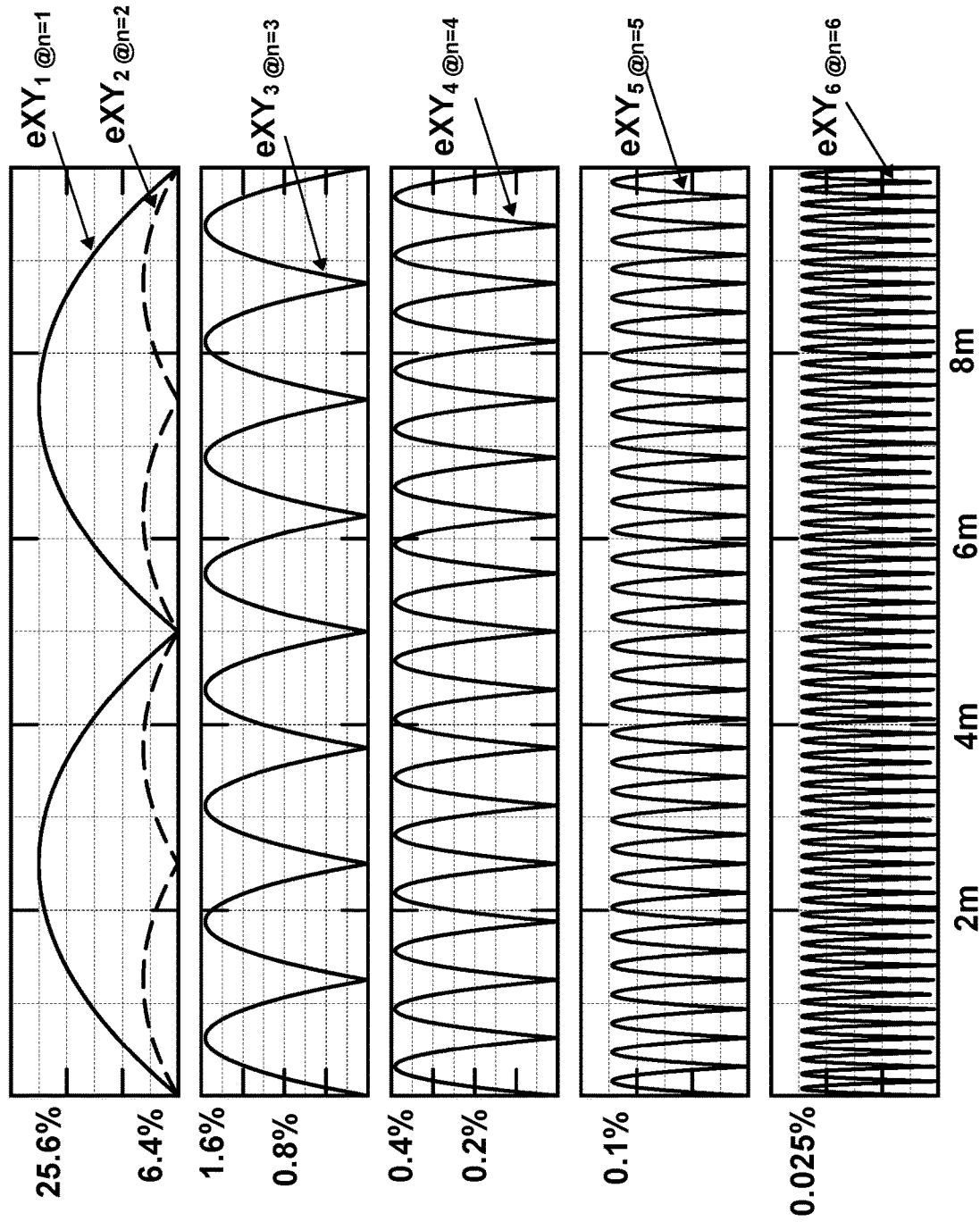
FIG. 7A is a simulation of a circuit's behavioral model showing the relation between the number of interpolations n and the error (i.e., deviation from an ideal multiplier) attributed to the aMULT method (illustrated in FIGS. 4A and 5A).

With n=1, FIG. 6A shows $XY_1$ (offset by a fraction of FS from its neighboring $XY_n$, for clarity of illustration) as a function of digital input words x and y that are spanned between -FS to +FS. As depicted in FIG. 7A, notice that with n=1, the ~$xy_1$ digital word is ~74.4% accurate as compared to ideal x×y. Thus, approximate multiplication error (as compared to an ideal multiplication) is $eXY_1$ @n=1~25.6% error.

In the second interpolation (n=2), the pair of $Xo_1$ and $yo_1$ digital output words from Cell 1 are fed as digital inputs onto a next digital combinational logic block $Cell2_1$. The digital input to digital output transfer function of Cell 2 is in accordance with $X_o$=|x+y|-|x-y| and $y_o$=$y_o$=|x+y|-|x-y|-FS, wherein x and y are the inputs and $X_o$ and $y_o$ are the outputs of Cell 2, respectively. Similarly, the approximate digital multiplication for cell 2 is generated in accordance with the mathematical transfer function $$\sim xy_{i+1} = xy_i + \frac{Xo_{i+1}}{2^{2i}}$$

or $$\sim xy_{i+1} = \sum_{i=0}^{n-1} \frac{Xo_{i+1}}{2^{2i}} ..$$

As such for $Cell2_1$, the second interpolation at i=1, then $$\sim xy_{1+1} = xy_1 + \frac{Xo_{1+1}}{2^{2 \times 1}} \Rightarrow xy_2 = xy_1 + \frac{Xo_2}{4}.$$

As noted above, bear in mind that $Xo_2$=|$Xo_1$+$y_{o1}$|-|$Xo_1$-$y_{o1}$|. For n=2, FIG. 6A shows $XY_2$ (offset by a fraction of FS from its neighboring $XY_n$, for clarity of illustration) as a function of digital input words x and y that are spanned between -FS to +FS. As depicted in FIG. 7A notice that at n=2, the ~$xy_2$ digital word is ~93.6% accurate as compared to an ideal x×y. Thus, approximate multiplication error (as compared to an ideal multiplication) is $eXY_2$ @n=2~6.4% error.

Also, in the next interpolation n=3, the pair of $Xo_2$ and $yo_2$ digital words that were generated by cell 2 are fed as digital inputs onto the next digital combinational logic block $Cell2_2$. The digital input to digital output transfer function of cell 2 is in accordance with $X_o$=|x+y|-|x-y| and $y_o$=$y_o$=|x+y|-|x-y|-FS, wherein x and y are the inputs and $X_o$ and $y_o$ are the outputs of Cell 2, respectively. Likewise, for $Cell2_2$ the next interpolation with i=2, then $$\sim xy_{2+1} = xy_2 + \frac{Xo_{2+1}}{2^{2 \times 2}} \Rightarrow xy_3 = xy_2 + \frac{Xo_3}{16}.$$

As noted above, bear in mind that $Xo_3$=|$Xo_2$+$y_{o2}$|-|$Xo_2$-$y_{o2}$|. For n=3, FIG. 6A shows $XY_3$ (offset by a fraction of FS from its neighboring $XY_n$, for clarity of illustration) as a function of digital input words x and y that are spanned between -FS to +FS. As depicted in FIG. 7A, notice that with another interpolation n=3, the ~$xy_3$ digital word is 98.4% accurate as compared to an ideal x×y. Thus, approximate multiplication error (as compared to an ideal multiplication) is $eXY_3$ @n=3~1.6% error.

Similarly, in the next interpolation n=4, the pair of $Xo_3$ and $yo_3$ digital words that were generated by cell 2 are fed as digital inputs onto the next digital combinational logic block $Cell2_3$. The digital input to digital output transfer function of cell 2 is also in accordance with $X_o=|x+y|-|x-y|$ and $y_o=y_o=|x+y|-|x-y|-FS$, wherein x and y are the inputs and $X_o$ and $y_o$ are the outputs of Cell 2, respectively. Similarly, for $Cell2_3$, the next interpolation with i=3, then $$\sim xy_{3+1} = xy_3 + \frac{Xo_{3+1}}{2^{2\times 3}} \Rightarrow \sim xy_4 = xy_3 + \frac{Xo_4}{64}.$$

As noted above, bear in mind that $Xo_4=|Xo_3+y_{o3}|-|Xo_3-y_{o3}|$. For n=4, FIG. 6A shows $XY_4$ (offset by a fraction of FS from its neighboring $XY_n$, for clarity of illustration) as a function of digital input words x and y that are similarly spanned between –FS to +FS. As depicted in FIG. 7A, notice that with another interpolation (n=4) the $\sim xy_4$ digital word is ~99.6% accurate as compared to an ideal x×y. Thus, approximate multiplication error (as compared to an ideal multiplication) is $eXY_4$ @n=4~0.4%.

Likewise, in the next interpolation n=5, the pair of $Xo_4$ and $yo_4$ digital words that were generated by cell 2 are fed as digital inputs onto the next digital combinational logic block $Cell2_4$. Also, the digital input to digital output transfer function of cell 2 is also in accordance with $X_o=|x+y|-|x-y|$ and $y_o=y_o=|x+y|-|x-y|-FS$, wherein x and y are the inputs and $X_o$ and $y_o$ are the outputs of Cell 2, respectively. Again, for $Cell2_4$ the next interpolation with i=4, then $$\sim xy_{4+1} = xy_4 + \frac{Xo_{4+1}}{2^{2\times 4}} \Rightarrow \sim xy_5 = xy_4 + \frac{Xo_5}{256}.$$

As noted earlier, $Xo_5=|Xo_4+Y_{o4}|-|Xo_4-y_{o4}|$. For n=5, FIG. 6A shows $XY_5$ (offset by a fraction of FS from its neighboring $XY_n$, for clarity of illustration) as a function of digital input words x and y that are similarly spanned between –FS to +FS. As depicted in FIG. 7A, notice that with another interpolation (n=5) the $\sim xy_5$ digital word is ~99.9% accurate as compared to an ideal x×y. Thus, approximate multiplication error (as compared to an ideal multiplication) is $eXY_5$ @n=5~0.1% error.

Lastly, for FIG. 4A and in the next interpolation n=6, the pair of $Xo_5$ and $yo_5$ digital words that were generated by cell 2 are fed as digital inputs onto the next digital combinational logic block $Cell2_5$. Similarly, the digital input to digital output transfer function of cell 2 is also in accordance with $X_o=|x+y|-|x-y|$ and $y_o=y_o=|x+y|-|x-y|-FS$, wherein x and y are the inputs and $X_o$ and $y_o$ are the outputs of Cell 2, respectively. Also, for $Cell2_5$, the next interpolation with i=5, then $$\sim xy_{5+1} = xy_5 + \frac{Xo_{5+1}}{2^{2\times 5}} \Rightarrow \sim xy_6 = xy_5 + \frac{Xo_5}{1024}.$$

As noted earlier, $Xo_6=|Xo_5+y_{o5}|-|Xo_5-y_{o5}|$. For n=6, FIG. 6A shows $XY_6$ (offset by a fraction of FS from its neighboring $XY_n$, for clarity of illustration) as a function of digital input words x and y that are similarly spanned between –FS to +FS. As depicted in FIG. 7A, notice that with another interpolation (n=6) the $\sim xy_6$ digital word is ~99.975% accurate as compared to an ideal x×y. Thus, approximate multiplication error (as compared to an ideal multiplication) is $eXY_6$ @n=6~0.025% error. Form the above description, when for example an approximate multiplier with ~0.025% precision (accuracy of ~12-bits) is needed, then n=6 interpolation can be implemented in accordance to the aMULT method.

There is an option and flexibility to increase the precision of the iMULT method by combining it with a conventional multiplier function at the tail end of the interpolation chain and here is how: The precision of $x_{in} \times y_{in}$ approximate multiplication can be increase by summing the $xy_{i+1}$ term to a scaled multiplication term $(Xo_{i+1} \times yo_{i+1})/2^{2i}$ at the tail-end of interpolation chain. With more interpolation down the Cell 2 cascade, the effective weight of $X_o$ and $y_o$ digital words (on the approximate multiplication results in accordance with the iMULT results) get smaller. Conventional multipliers occupy substantially smaller area when multiplying smaller bit-width (e.g., 2-bit by 2-bit multiplier), and a divide by 2 digital function requires a simple bit shift-right in a shift register which is small. Hence, the digital implementation of $(Xo_{i+1} \times yo_{i+1})/2^{2i}$ could take a small gate count. Accordingly, the increased gate count area attributed to utilizing a conventional multiplier at the tail-end, may be worth the increase in precision of approximate multiplication and provide additional cost-performance flexibility in accordance with different application requirements. For example, in FIG. 4A, $xy_{4A}=xy_4+(Xo_4 \times yo_4)/2^{2\times 3}$ wherein the precision of $xy_{4A}$ is substantially higher than the precision of $\sim xy_4$. Similarly, $xy_{5A}=xy_5+(Xo_5 \times yo_5)/2^{2\times 4}$ wherein the precision of $xy_{5A}$ is substantially higher than the precision of $\sim xy_5$.

In summary, some of the benefits of an asynchronous digital multiplier unitizing the aMULT method care the following:

First, conventional multipliers require many full adders which occupy large area in the digital domain, generally speaking. The aMULT method can be implemented in the digital domain with fewer adders (compared to a conventional digital squarer) which makes it more area efficient.

Second, utilizing the aMULT method having more interpolations n, the peak-to-peak digital value of sequential $xy_n$ digital words diminish with increasing # of n, which can help reduced the overall logic gate-count of its implementation.

Third, the aMULT method generates a number of points (digital words) that exactly (represent) fit the square function, and linearly interpolates in-between those points. The more the number of interpolation (n), the greater the number of points that exactly fit an ideal multiplication result and thus the less the error associated with linearly interpolating in between those exact fit points.

Fourth, fewer gates in a digital circuit generally go hand-in-hand with lower dynamic power consumption and faster speed. As such, since the aMULT method requires fewer gates for implementing a multiplication function, it can function with higher speed and lower dynamic power consumption compared to convocational digital IC multiplier implementations, for a given resolution.

Fifth, the disclosed digital IC approximate multiplier can be arranged to performed multiply and accumulate (MAC) functions in mixed-mode. For example, plurality of outputs of approximate digital multiplier ICs can be inputted to plurality of current mode Digital-to-Analog-Converters (iDACs), wherein the function of summation (e.g., adding two multiplications) can be performed simply by coupling together the current output terminals of plurality of iDACs.

Sixth, the similarities between Cell 1 and Cell 2, and the similarities between the $X_o=|x+y|-|x-y|$ and the $y_o=y_o=|x+y|-|x-y|-FS$ digital functionality can be taken advantage of and to help share logic circuitry, lower dynamic power consumption, and save on gate count.

Seventh, there is the option and flexibility to increase the precision of the aMULT method substantially by combining it with a conventional multiplier function at the tail end of the interpolation chain.

Figure 5A:
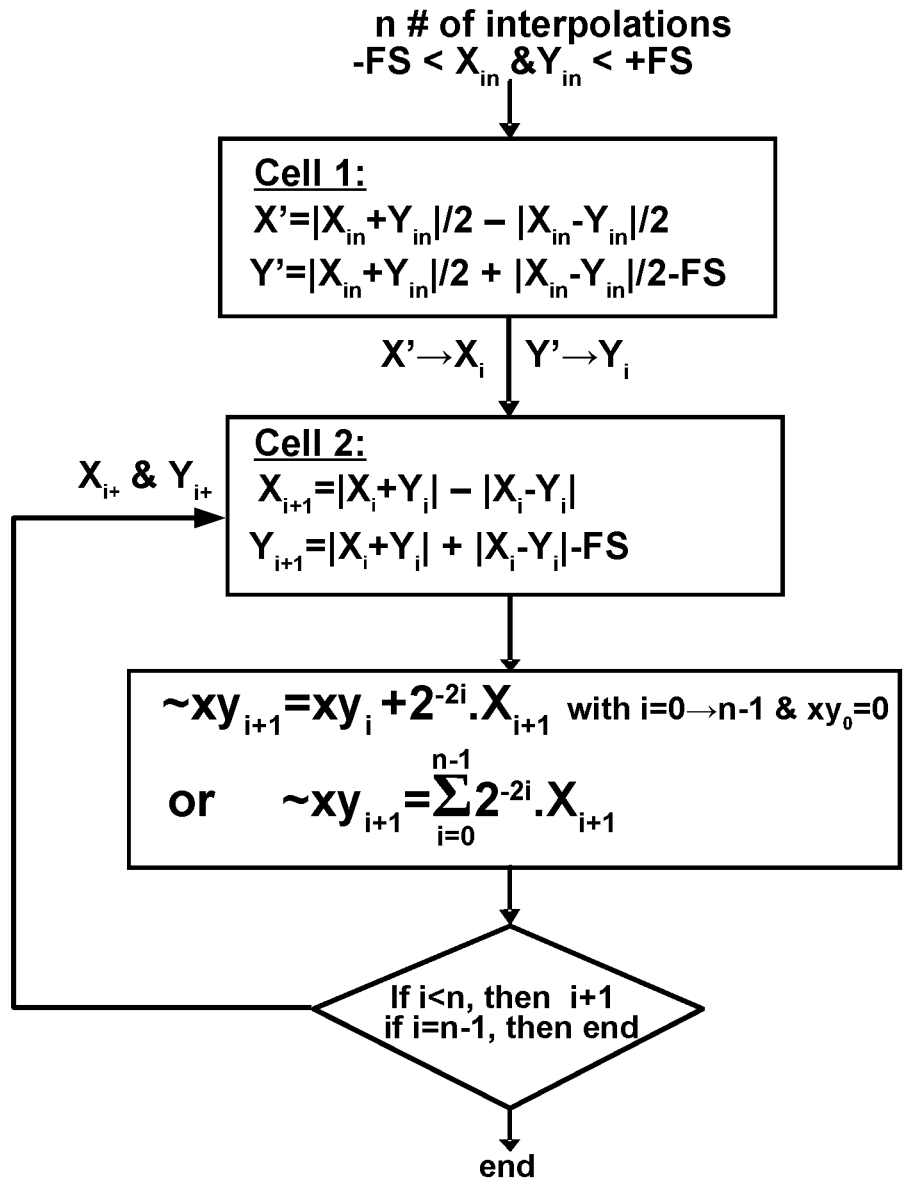
FIG. 5A is a flow chart illustrating an approximate multiplier method (aMULT) that can be utilized in a digital synchronous multiplier IC.

Section 5A—Description of FIG. 5A

FIG. 5A is a flow chart illustrating the approximate multiplier method (aMULT) that can be utilized in a synchronous arrangement. The aMULT method can be implemented utilizing a digital IC state machine in a following manner. With a pair of digital input words $x_{in}=X$ and $y_{in}=Y$ that spans from negative full scale −FS to positive full scale +FS, a digital IC state machine is arranged in accordance with the aMULT method can generate an approximate digital word multiplication result $xy_n$ which is an approximate multiplication representation of $x_{in} \times y_{in}$. The precision of $xy_n$ (or the degree of imprecision of the multiplication approximation) can be pre-programmed or programmed into the digital IC state machine in real-time (on the fly) by n which is the number of times (or the interpolations) the aMULT method is cycled (or time-multiplied) through the digital state machine. Keep in mind that the aMULT method utilizing six interpolations here is for illustrative simplicity, and not as a limitation of the aMULT method that can accommodate higher interpolation (n >6) which will result in higher precision.

The pair of digital input words $x_{in}=X$ and $y_{in}=Y$ are inputted to Cell 1 generate a respective pair of digital output words $X_1$ and $Y_1$ with the following digital-input to digital-output transfer function:

$$X' = \frac{|x_{in} + y_{in}|}{2} - \frac{|x_{in} - y_{in}|}{2}$$

and $$Y' = \frac{|x_{in} + y_{in}|}{2} + \frac{|x_{in} - y_{in}|}{2} - FS.$$

The pair of digital output words $X'=x_i$ and $Y'=y_i$ are then fed onto a Cell 2 as part of a clocked state machine loop which generates a clocked sequence of digital output words $X_{i+1}$ and $Y_{i+1}$ wherein the number of clocked steps (i) in the digital step machine is a function of number of objective interpolations (n). The Cell 2 digital input to digital output transfer function is as follows: $X_{i+1}=|x_i+y_i|-|x_i-y_i|$ and $Y_{i+1}=|x_i+y_i|+|x_i-y_i|-FS$. The digital step machine loop continues cycling if i<n, and when i=n, then the state machine stops. While i in the state machine incrementally counts up, the Cell 2 continues generating incremental approximate multiplication results ($\sim XY_{i+1} \approx \sim xy_n \approx x_{in} \times y_{in}$) according to the following transfer function of $$xy_{i+1} = \sum_{i=0}^{n-1} \frac{X_{i+1}}{2^{2i}}$$

or $$xy_{i+1} = xy_i + \frac{X_{i+1}}{2^{2i}}$$

with $xy_0=0$ and i incrementally counts from 0 up to n−1, and wherein the accuracy of approximate multiplication increases by 4 times for every additional interpolation step i.

Although the flow chart of FIG. 5A depicts Cell 1 and Cell 2 separately (for clarity of illustration), notice that Cell 1 can be arranged inside the clocked state machine comprising of Cell 2, wherein the difference between them is in a divide by two, which is a simple shift function in a register (e.g., $$\frac{|x_{in} + y_{in}|}{2}$$

and $$\frac{|x_{in} - y_{in}|}{2}$$

for Cell 1 and $|x_i+y_i|-|x_i-y_i|$ for Cell 2).

As indicated in the previous section, FIG. 6A illustrates the aMULT method's approximate multiplication results for digital output words with increasing number of one to six interpolations $xy_1$ through $xy_6$ (offset by a fraction of FS from its neighboring $xy_n$, for clarity of illustration) as a function of digital input words $x_{in}$ and $y_{in}$ that are each spanned between −FS to +FS. Similar to the last sections, FIG. 7A illustrates the precision of approximate multiplication rising (i.e., lower approximation error $eXY_1$ to $eXY_6$) with increasing number of interpolations from n=1 to n=6, wherein the precision of approximate multiplication result is raised by 4 times for every incremental interpolation.

Bear in mind that as explained in section 4A, there is an option for increasing the precision of the aMULT method, also when utilized in a synchronous mode, by combining it with a conventional multiplier at the tail end of the interpolation chain.

Some of the benefits of the aMULT method, operating in a synchronous mode, are summarized below:

First, the aMULT method enables a digital IC state machine to perform on-the fly or pre-programming of precision versus power consumption, and speed of an approximate digital multiplier. The lower the precision requirement, the faster the multiplying and the lower the power consumption per the multiplying operation. As such, the precision of multiplication approximation can be traded off with cost, speed, and power consumption depending on application cots-performance objectives.

Second, the disclosed digital IC approximate multiplication can be arranged for multiply and accumulate (MAC) functions in pure digital and or mixed-mode. For example, plurality of outputs of approximate digital IC multipliers can be inputted to plurality of current mode Digital-to-Analog-Converters (iDAC), wherein the function of summation (e.g., adding two multiplications) can be performed simply by coupling together the current output terminals of plurality of the said iDACs.

Third, the commonalities between Cell 1 and Cell 2, and shared functionalities between the $X_{i+1}=|x_i+y_i|-|x_i-y_i|$ and the $Y_{i+1}=|x_i+y_i|+|x_i-y_i|-FS$ digital functionality can be taken advantage of and to help share logic circuitry, lower dynamic power consumption, and save on gate count.

Fourth, there is the option and flexibility to increase the precision of the aMULT method substantially here by combining it with a conventional multiplier function at the tail end of the interpolation chain.

Section 6A—Description of FIG. 6A

FIG. 6A is simulation of a circuit's behavioral model, utilizing the aMULT method (illustrated in FIGS. 4A and 5A), that shows a plurality of multiplication waveforms $XY_n$ as a function of n=# of interpolations. Bear in mind that the illustrated simulations here is intended to further clarify the disclosed aMULT method and not as a limitation on the performance of the disclosed aMULT method.

The horizontal axis indicates the pair of digital input words $x_{in}$ and $y_{in}$ that span between -FS to +FS over 10 milli-seconds (ms).

The vertical axis shows the approximate $x_{in} \times y_{in}$ multiplications results of $XY_1$ to $XY_6$ of the aMULT method, as function of n=1 to n=6 number of interpolations. Keep in mind that the approximate multiplications result $XY_1$ through $XY_6$ are offset by a fraction of FS from its neighboring $XY_n$, for clarity of illustration.

Section 7A—Description of FIG. 7A

FIG. 7A is a simulation of a circuit's behavioral model showing the relation between the number of interpolations n and the error (i.e., deviation from an ideal multiplier) attributed to the aMULT method (illustrated in FIGS. 4A and 5A). Bear in mind that the illustrated simulations here is intended to further clarify the disclosed aMULT method and not as a limitation on the performance of the disclosed aMULT method.

The horizontal axis indicates the pair of digital input words $x_{in}$ and $y_{in}$ that span between -FS to +FS over 10 milli-seconds (ms).

The vertical axis shows the percent (%) of inaccuracy ($eXY_1$ to $eXY_6$) of the aMULT method as compared to an ideal multiplier, as function of n=1 to n=6 number of interpolations.

The aMULT approximate multiplication error as a function of n number of interpolation is: $eXY_1$=25.6% for n=1, $eXY_2$=6.4% for n=2, $eXY_3$=1.6% for n=3, $eXY_4$=0.4% for n=4, $eXY_5$=0.1% for n=5, and $eXY_6$=0.0125% for n=6. Notice that precision of approximate multiplication improves by $2^2$=4 times for every +1 incremental interpolation.

Figure 8A:
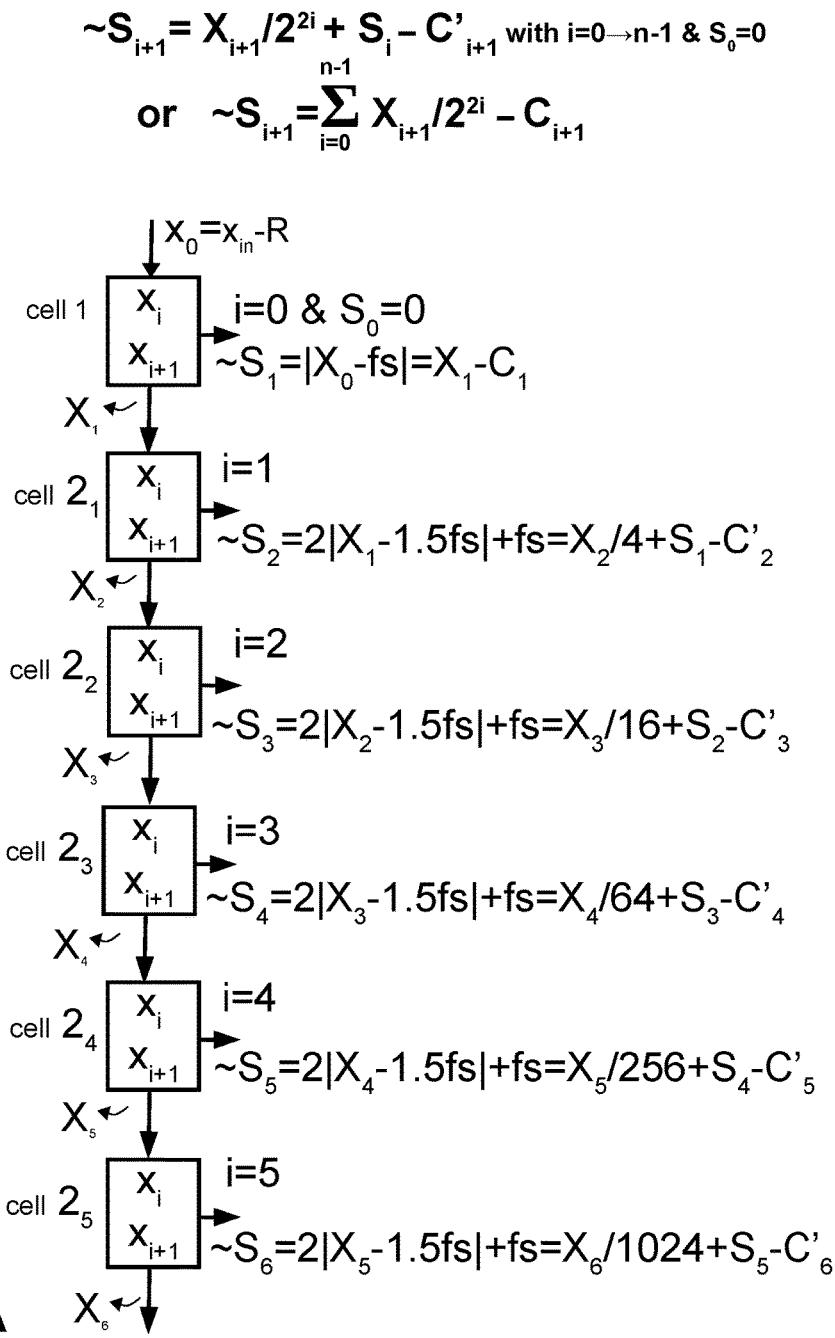
FIG. 8A is a simplified functional block diagram of another approximate squarer method (aSQR') that can be utilized in a digital asynchronous (clock-free) squarer IC.

Section 8A—Description of FIG. 8A

FIG. 8A is a simplified functional block diagram of another approximate squarer method (aSQR') that can be utilized in a digital asynchronous (clock-free) squarer IC.

In a digital squarer IC that is arranged in accordance with the aSQR' method, a digital input word $(x_{in}-R)=X_0$ can be approximately squared $\sim S_n \approx (x_{in}-R)^2$ through a series of n interpolation asynchronously (without a clock), wherein the accuracy of the $\sim S_n$ digital word square result can be increased with more n interpolations. Keep in mind that R is a digital reference scale for +FS and -FS, which shall be explained shortly.

As an example, two interpolations generate an approximate square digital word $\sim S_2$ whereas n >2 interpolations generate an approximate square digital word $\sim S_n$, wherein $\sim S_2$ is less precise than $\sim S_n$. Generally speaking, the fewer the interpolations n, the less the precision of the approximate square results. But fewer interpolations can be done faster with less power consumption and less logic gate count (cheaper). This feature of the aSQR' method would enable the end application to pre-program and optimize the approximate squaring function in accordance with the end application cost-performance objectives. As noted earlier, for cost sensitive applications the aSQR' method can be utilized synchronously where an approximate squarer digital IC cell block (e.g., cell 2) is re-used in a time-multiplexed loop through a sequence of cycles (i.e., n-times). Conversely, for speed sensitive applications, the aSQR' method can be utilized asynchronously (clock-free) through a cascaded series of n interpolations implemented in combinational logic.

In the proceeding description, note that the range of the $x_{in}$ digital word is from negative full-scale (-FS=0) which can be all zero-bits to positive full-scale (+FS=2R) which can be all one-bits. Note that R is a digital reference scale to show that 0×R can be -FS, 1×R can be zero-scale (ZS), and 2×R can be +FS. Keep in mind that the aSQR' method utilizing six interpolations here is for illustrative simplicity, and not as a limitation of the aSQR' method that can accommodate higher interpolation (n >6) which will result in higher precision.

With the first interpolation (n=1), the $(x_{in}-R)=X_0$ digital input word is inputted to a digital combinational logic block Cell 1 which generates digital output word $X_{i+1}$ in accordance to the following input-output transfer functions: $X_{i+1}=|X_i-FS|$. The approximate digital squaring in Cell 1 is generated in accordance with the mathematical transfer function $$\sim S_{i+1} = \frac{X_{i+1}}{2^{2i}} + S_i - C'_{i+1}$$

(wherein $S_0$=0 and i=0→n-1) or $$\sim S_{i+1} = \sum_{i=0}^{n-1} \frac{X_{i+1}}{2^{2i}} - C_{i+1}.$$

Figure 10A:
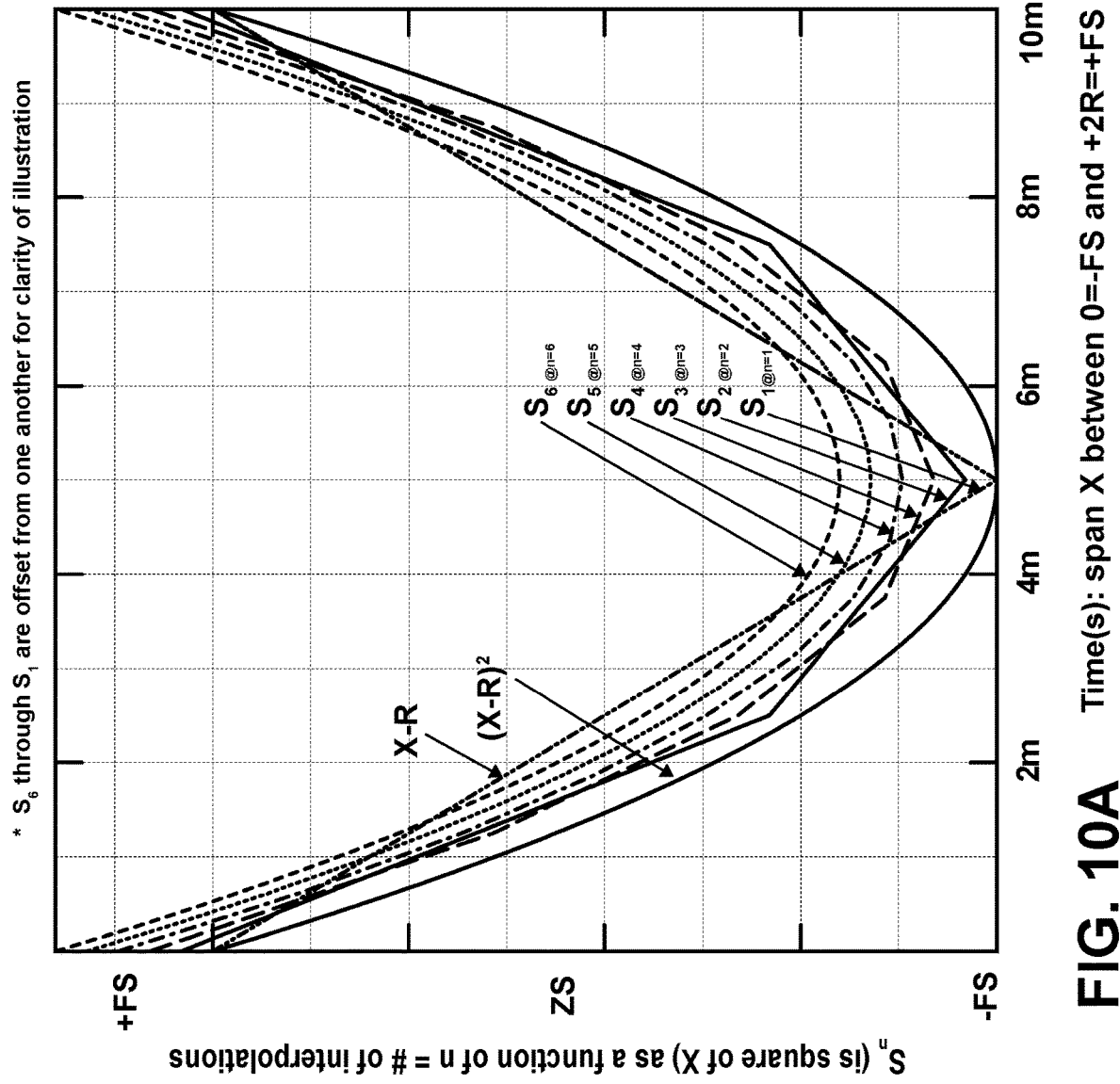
FIG. 10A is simulation of a circuit's behavioral model, utilizing the aSQR' method (illustrated in FIGS. 8A and 9A), that shows a plurality of squarer waveforms Sn as a function of n interpolations.
Figure 11A:
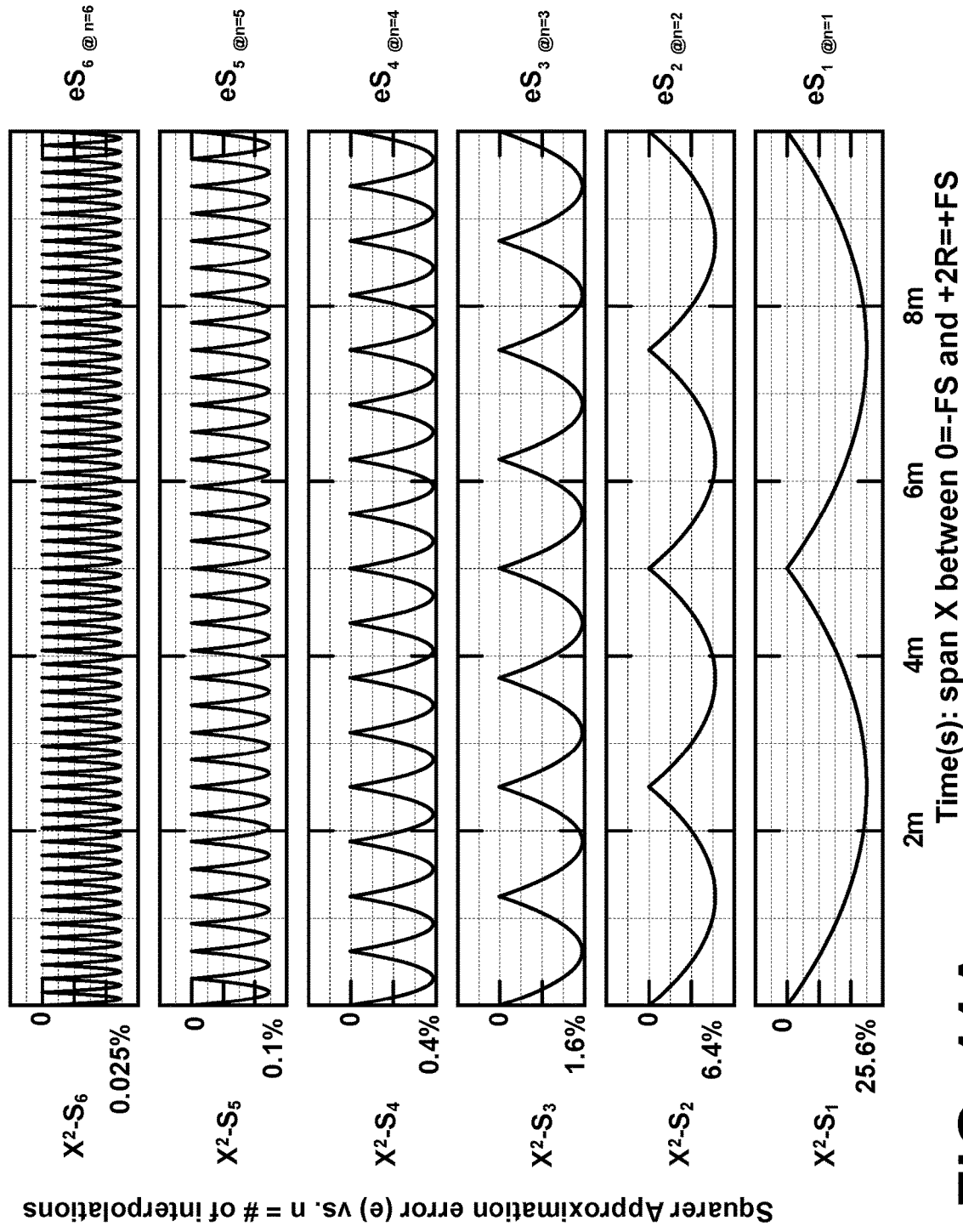
FIG. 11A is a simulation of a circuit's behavioral model showing the relation between the number of interpolations n and the error (i.e., deviation from an ideal squarer) attributed to the aSQR' method (illustrated in FIGS. 8A and 9A).

As such for Cell 1, in the first interpolation with i=0 and programming $S_0$=0, $C_{i+1}$=a digital constant proportional to full-scale (FS) value, then $\sim S_{0+1}=X_{0+1}+C_{0+1} \Rightarrow \sim S_1=X_1+C_1$. With n=1, FIG. 10A shows $\sim S_1$ (offset by a fraction of FS from its neighboring $\sim S_n$, for clarity of illustration) as a function of the digital input word. As depicted in FIG. 11A, notice that with n=1, the $\sim S_1$ digital word is ~74.4% accurate as compared to an ideal digital input signal squared. Thus, the error of the disclosed approximate squarer compared to an ideal one is $eS_1$ @n=1~25.6% error).

In the second interpolation (n=2), the $X_1$ digital output word from cell 1 is inputted to a digital combinational logic block Cell 2 which generates a digital output word $X_{i+1}=X_2$ in accordance to the following input-output transfer functions: $X_{i+1}=2\times|X_i-1.5\times FS|+FS$. The approximate digital squaring in Cell 2 is generated in also accordance with the mathematical transfer function $$\sim S_{i+1} = \frac{X_{i+1}}{2^{2i}} + S_i - C'_{i+1}$$

(wherein $S_0=0$ and $i=0 \to n-1$) or $$\sim S_{i+1} = \sum_{i=0}^{n-1} \frac{X_{i+1}}{2^{2i}} - C_{i+1}.$$

As such for Cell $2_1$, in the second interpolation with $i=1$ and similarly programming $C_{i+1}$=a digital constant proportional to FS, then $$\sim S_{1+1} = \frac{X_{1+1}}{2^{2\times 1}} + S_1 - C_{1+1} \Rightarrow \sim S_2 = \frac{X_2}{4} + X_1 + C_1 - C_2 = \frac{X_2}{4} + S_1 - C_2'.$$

With n=2, FIG. 10A shows $\sim S_2$ (offset by a fraction of FS from its neighboring $\sim S_n$, for clarity of illustration) as a function of the digital input word. As depicted in FIG. 11A, notice that with n=2, the $\sim S_2$ digital word is ~93.6% accurate as compared to an ideal digital input signal squared. Thus, the error of the disclosed approximate squarer compared to an ideal one is $eS_2$ @n=2~6.4% error.

Likewise, in the third interpolation (n=3), the $X_2$ digital output word from the previous cell 2 is inputted to the next one which generates a digital output word $X_{i+1}=X_3$ also in accordance to the following input-output transfer functions: $X_{i+1}=2\times|X_i-1.5\times FS|+FS$. Similarly, for Cell $2_2$ in the third interpolation with $i=2$ and similarly programming $C'_{i+1}$ is a digital constant function proportional to FS, then $$\sim S_{2+1} = \frac{X_{2+1}}{2^{2\times 2}} + S_2 - C_{2+1} \Rightarrow \sim S_3 = \frac{X_3}{16} + S_2 - C_3'.$$

With n=3, FIG. 10A shows $\sim S_3$ (offset by a fraction of FS from its neighboring $\sim S_n$, for clarity of illustration) as a function of the digital input word. As depicted in FIG. 11A, notice that with n=3, the $\sim S_3$ digital word is ~98.4% accurate as compared to an ideal digital input signal squared. Thus, the error of the disclosed approximate squarer compared to an ideal one is $eS_3$ @n=3~1.6% error.

Similarly, in the fourth interpolation (n=4), the $X_3$ digital output word from the previous cell 2 is inputted to the next one which generates a digital output word $X_{i+1}=X_4$ also in accordance to the following input-output transfer functions: $X_{i+1}=2\times|X_i-1.5\times FS|+FS$. Again, for Cell $2_3$, in the fourth interpolation with $i=3$ and similarly programming $C_{i+1}$=a constant, then $$\sim S_{3+1} = \frac{X_{3+1}}{2^{2\times 3}} + S_3 - C_{3+1} \Rightarrow \sim S_4 = \frac{X_4}{64} + S_3 - C_4'.$$

With n=4, FIG. 10A shows $\sim S_4$ (offset by a fraction of FS from its neighboring $\sim S_n$, for clarity of illustration) as a function of the digital input word. As depicted in FIG. 11A, notice that with n=4, the $\sim S_4$ digital word is ~99.6% accurate as compared to an ideal digital input signal squared. Thus, the error of the disclosed approximate squarer compared to an ideal one is $eS_4$ @n=4~0.4% error.

Also, in the fifth interpolation (n=5), the $X_4$ digital output word from the previous cell 2 is inputted to the next one which generates a digital output word $X_{i+1}=X_5$ also in accordance to the following input-output transfer functions: $X_{i+1}=2\times|X_i-1.5\times FS|+FS$. Also, for Cell $2_4$ in the fourth interpolation with $i=4$ and similarly programming $C_{i+1}$=a constant, then $$\sim S_{4+1} = \frac{X_{4+1}}{2^{2\times 4}} + S_4 - C_{4+1} \Rightarrow \sim S_5 = \frac{X_5}{256} + S_4 - C_5'.$$

With n=5, FIG. 10A shows $\sim S_5$ (offset by a fraction of FS from its neighboring $\sim S_n$, for clarity of illustration) as a function of the digital input word. As depicted in FIG. 11A, notice that with n=5, the $\sim S_5$ digital word is ~99.9% accurate as compared to an ideal digital input signal squared. Thus, the error of the disclosed approximate squarer compared to an ideal one is $eS_5$ @n=5~0.1% error.

Again, in the sixth interpolation (n=6), the $X_5$ digital output word from the previous cell 2 is inputted to the next one which generates a digital output word $X_{i+1}=X_6$ also in accordance to the following input-output transfer functions: $X_{i+1}=2\times|X_i-1.5\times FS|+FS$. Similarly, for Cell $2_5$ in the fourth interpolation with $i=5$ and similarly programming $C_{i+1}$=a constant, then $$\sim S_{5+1} = \frac{X_{5+1}}{2^{2\times 5}} + S_5 - C_{5+1} \Rightarrow \sim S_6 = \frac{X_6}{1024} + S_5 - C_6'.$$

With n=6, FIG. 10A shows $\sim S_6$ (offset by a fraction of FS from its neighboring $\sim S_n$, for clarity of illustration) as a function of the digital input word. As depicted in FIG. 11A, notice that with n=6, the $\sim S_6$ digital word is ~99.975% accurate as compared to an ideal digital input signal squared. Thus, the error of the disclosed approximate squarer compared to an ideal one is $eS_6$ @n=6~0.025% error.

In summary, some of the benefits of an asynchronous digital multiplier unitizing the aSQR' method care the following:

First, conventional multipliers require many full adders which occupy large area in the digital domain, generally speaking. The aSQR' method can be implemented in the digital domain with fewer adders (compared to a conventional digital squarer) which makes it more area efficient.

Second, implementing the aSQR' method requires a number square or divide by two operations which can be implemented inexpensively in the digital domain by a shift right or left operation in for example a shift-register, whose bit-width size requirements decreases with increasing division.

Third, utilizing the aSQR' method having more interpolations n, the peak-to-peak digital value of sequential $\sim S_n$ digital words diminish with increasing # of n, which can help reduced the overall logic gate-count of its implementation.

Fourth, the aSQR' method generates a number of points (digital words) that exactly (represent) fit the square function, and linearly interpolates in-between those points. The more the number of interpolation (n), the greater the number of points that exactly fit an ideal squarer result and thus the less the error associated with linear interpolations in between those exact fit points.

Fifth, fewer gates in a digital circuit generally go hand-in-hand with lower dynamic power consumption and faster speed. As such, since the aSQR' method requires fewer gates for implementing a squarer function, it can function with higher speed and lower dynamic power consumption compared to convocational digital IC multiplier implementations, for a given resolution.

Sixth, the disclosed digital IC approximate squarer can be arranged to perform approximate multiplication by utilizing the quarter square algorithm Accordingly, digital IC multiplication can be performed by deducting the square of subtraction of two digital words (x, y) from the square of their summation as in $(x+y)^2+(x-y)^2=4xy$. Also, note that the constant terms ($C_{i+1}$) in the approximate squaring ($\sim S_{i+1}$) gets canceled out in light of the subtraction of the quarter square method, which reduced the logic gate count in utilizing the aSQR' method within the quarter square algorithm to perform a multiplication function.

Seventh, the disclosed digital IC approximate squarer can be arranged to performed square and accumulate (SAC) and multiply and accumulate (MAC) functions in mixed-mode. For example, plurality of outputs of approximate digital multiplier ICs can be inputted to plurality of current mode Digital-to-Analog-Converters (iDACs), wherein the function of summation (e.g., adding two squarers) can be performed simply by coupling together the current output terminals of plurality of iDACs.

Figure 9A:
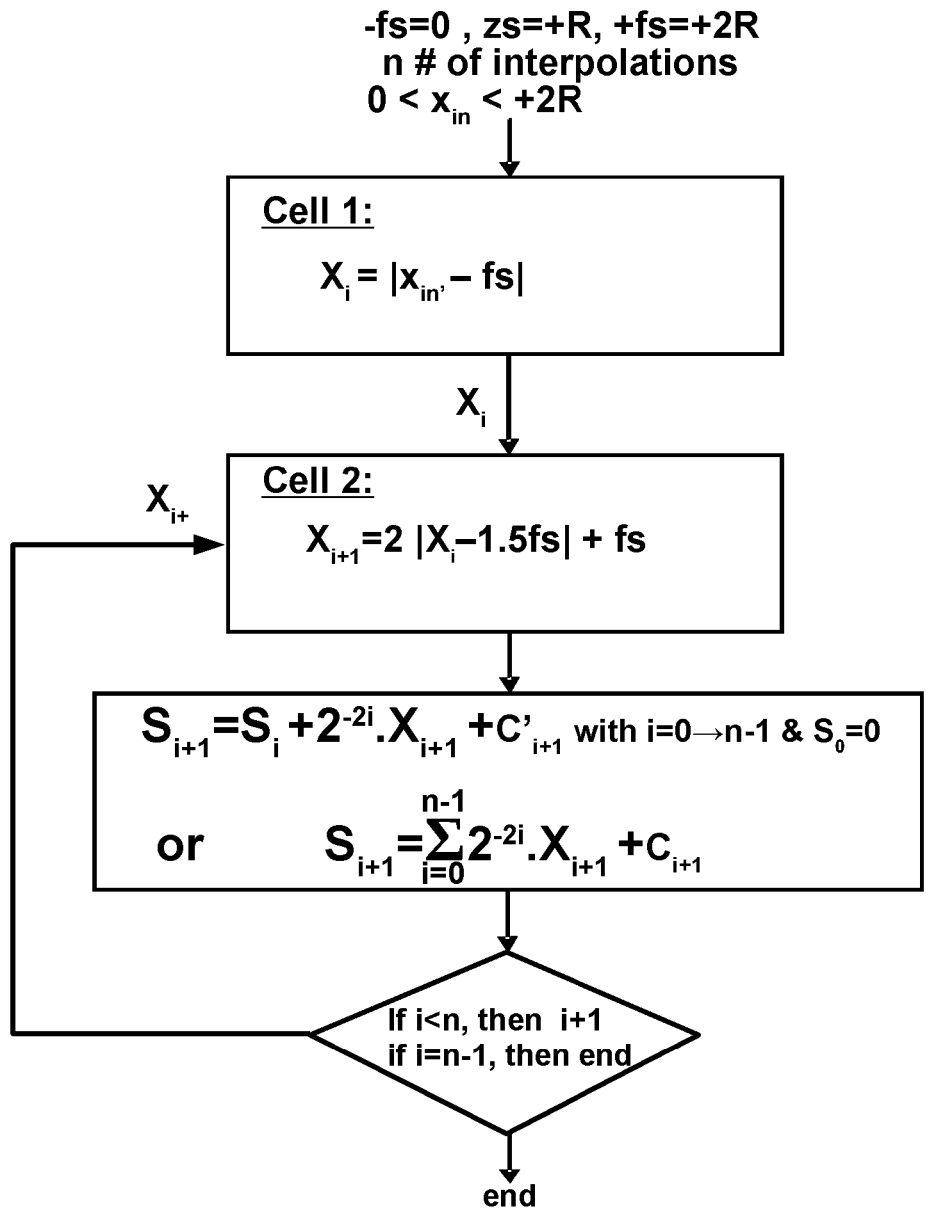
FIG. 9A is a flow chart illustrating another approximate squarer method (aSQR') that can be utilized in a digital synchronous squarer IC.

Section 9A—Description of FIG. 9A

FIG. 9A is a flow chart illustrating another approximate squarer method (aSQR') that can be utilized in a synchronous digital squarer IC.

In a looped state machine digital squarer IC that is arranged in accordance with the aSQR' method, a digital input word $(x_{in}-R)=X_i=X_0$ can be approximately squared $\sim S_n \approx (x_{in}-R)^2$ through a looped series of n interpolation asynchronously (without a clock), wherein the accuracy of the $\sim S_n$ digital word square result can be increased with more n interpolations.

The precision (i.e., the degree of squarer approximation) of $\sim S_n$ can be pre-programmed or programmed into the digital IC state machine in real-time by inputting a digital word n that is the number of times (or the interpolations) the aSQR' method is cycled or time-multiplexed through the digital state machine. Keep in mind that the aSQR' method utilizing six interpolations in the simulation waveforms depicted in FIG. 10A and FIG. 11A are for illustrative simplicity, and not as a limitation of the aSQR' method that can accommodate higher interpolation (n >6) which will result in higher precision.

In the first interpolation (n=1), the $(x_{in}-R)=x_{in}$, digital input word is inputted to a digital Cell 1 which generates digital output word $X_{i+1}$ in accordance to the following input-output transfer functions: $X_i=|x_{in}-FS|$. The approximate digital squaring in Cell 1 is generated in accordance with the mathematical transfer function $$\sim S_{i+1} = \frac{X_{i+1}}{2^{2i}} + S_i - C'_{i+1}$$

(wherein $S_0=0$ and $i=0 \rightarrow n-1$) or $$\sim S_{i+1} = \sum_{i=0}^{n-1} \frac{X_{i+1}}{2^{2i}} - C_{i+1}.$$

As such for Cell 1, in the first interpolation with i=0 and programming $S_0=0$, $C_{i+1}=$a digital constant proportional to full-scale (FS), then $\sim S_{0+1}=X_{0+1}+C_{0+1} \Rightarrow \sim S_1=X_1+C_1$.

The Cell 2 digital input to digital output transfer function is as follows: $X_{i+1}=2\times|X_i-1.5FS|+FS$. Accordingly, the digital step machine loop continues cycling if i<n, and when i=n, then the digital state machine stops. While i in the state machine is incrementing up, the Cell 2 continues generating digital in accordance with the mathematical transfer function $$\sim S_{i+1} = \frac{X_{i+1}}{2^{2i}} + S_i - C'_{i+1}$$

(wherein $S_0=0$ and $i=0 \rightarrow n-1$) or $$\sim S_{i+1} = \sum_{i=0}^{n-1} \frac{X_{i+1}}{2^{2i}} - C_{i+1},$$

and wherein the accuracy of approximate squarer increases by 4 times for every +1 incremental interpolation step i.

As indicated in the previous section, FIG. 10A illustrates the aSQR' method's approximate squarer results for digital output words $\sim S_1$ through $\sim S_6$ as a function of digital input word $(x_{in}-R)$ that is spanned between −FS to +FS. Note that each of the $\sim S_1$ through $\sim S_6$ are offset by a fraction of FS from one another, for clarity of illustration.

Similar to the last sections, FIG. 11A illustrates the precision of approximate squarer rising (i.e., lower approximation error $eS_1$ to $eS_6$) with increasing number of interpolations from n=1 to n=6, wherein the precision of approximate squarer result is improved by 4 times for every incremental interpolation.

Some of the benefits of the aSQR' method, operating in a synchronous mode, are summarized below:

First, the aSQR' method enables a digital IC state machine to perform on-the fly or pre-programming of precision versus power consumption, and speed of an approximate digital multiplier. The lower the precision requirement, the faster the squaring and the lower the power consumption per the squaring operation. As such, the precision of squarer approximation can be traded off with cost, speed, and power consumption depending on application cots-performance objectives.

Second, relatively speaking while addition (subtraction) occupies a large area in the digital domain, a digital IC state machine arranged in accordance with the disclosed aSQR' method utilizes fewer adders compared to a conventional digital IC squarers. Instead, the disclosed aSQR' method requires functions such as square or divide by two, that can be implemented by a simple shift to the right or left in the digital domain, which takes a small die area. Moreover, the aSQR' method can utilize functions such as for example full-wave or half-wave rectifications and adding or subtracting a fixed digital value (in proportion to an input digital word's full scale), which can also take a relatively small area.

Third, the disclosed digital IC approximate squarer can be arranged to perform approximate multiplication by utilizing the quarter square algorithm Accordingly, digital IC multiplication can be performed by deducting the square of subtraction of two digital words (x, y) from the square of their summation as in $(x+y)^2+(x-y)^2=4xy$. Also, keep in mind that the constant terms (e.g., $C_{i+1}$ and $C'_{i+1}$) in the approximate squaring ($\sim S_{i+1}$) gets canceled out in light of the subtraction of the quarter square method, which reduced the logic gate count (otherwise attributed to the constant terms) in utilizing the aSQR' method within the quarter square algorithm to perform a multiplication function.

Fourth, the disclosed digital IC approximate squarer can be arranged to performed square and accumulate (SAC) and multiply and accumulate (MAC) functions in mixed-mode. For example, plurality of outputs of approximate digital multiplier ICs can be inputted to plurality of current mode Digital-to-Analog-Converters (iDACs), wherein the function of summation (e.g., adding two squarers) can be performed simply by coupling together the current output terminals of plurality of iDACs.

Section 10A—Description of FIG. 10A

FIG. 10A is simulation of a circuit's behavioral model, utilizing the aSQR' method (illustrated in FIGS. 8A and 9A), that shows a plurality of squarer waveforms $S_n$ as a function of n=# of interpolations. Bear in mind that the illustrated simulations here is intended to further clarify the disclosed aSQR' method and not as a limitation on the performance of the disclosed aSQR' method.

The horizontal axis indicates the digital input word $X_i$ that span between -FS to +FS over 10 milli-seconds (ms).

The vertical axis shows the approximate $X_i^2$ multiplications results of $\sim S_1$ to $\sim S_6$ of the aSQR method, as function of n=1 to n=6 which is the number of interpolations. Keep in mind that the approximate squarer results $\sim S1_1$ through $\sim S_6$ are offset by a fraction of FS from its neighboring $\sim S_n$, for clarity of illustration.

Section 11A—Description of FIG. 11A

FIG. 11A is a simulation of a circuit's behavioral model showing the relation between the number of interpolations n and the error (i.e., deviation from an ideal squarer) attributed to the aSQR' method (illustrated in FIGS. 8A and 9A) Bear in mind that the illustrated simulations here is intended to further clarify the disclosed aSQR' method and not as a limitation on the performance of the disclosed aSQR' method.

The horizontal axis indicates the digital input word $X_i$ that span between -FS to +FS over 10 milli-seconds (ms).

The vertical axis shows the percent (%) of inaccuracy ($eS_1$ to $eS_6$) of the aSQR' method as compared to an ideal squarer, as function of n=1 to n=6 number of interpolations.

The aSQR' approximate multiplication errors as a function of n number of interpolation are: $eS_1$=25.6% for n=1, $eS_2$=6.4% for n=2, $eS_3$=1.6% for n=3, $eS_4$=0.4% for n=4, $eS_5$=0.1% for n=5, and $eS_6$=0.0125% for n=6. Notice that precision of approximate squarer improves by $2^2$=4 times for every +1 incremental interpolation.

What is claimed:

1. An approximate digital multiplication method in a digital state machine in an integrated circuit, the method comprising:
   operating a digital cell (Z), the digital cell (Z) comprising:
      a pair of digital input ports (Px,Py) for receiving a pair of digital input words (x,y), a pair of digital output ports ($PX_o$,$PY_o$) for outputting a pair of digital output words ($X_o$,$Y_o$), wherein the pair of digital input words (x,y) span between a negative full-scale (-FS) and a positive full-scale (+FS);
   computing each digital output word $X_o$ of the digital cell (Z) as a function of an f-scaled absolute value of a sum of the digital input word x plus the digital input word y minus the f-scaled absolute value of the digital input word x minus the digital input word y;
   computing each digital output word $Y_o$ of the digital cell (Z) as a function of the f-scaled absolute value of a sum of the digital input word x plus the digital input word y plus the f-scaled absolute value of the digital input word x minus the digital input word y minus the positive full-scale (+FS);
   wherein $$\frac{1}{2^m} < f < 2^m$$

wherein 0<m<10;
   operating a plurality (n) of the digital cell (Z);
   programming an interpolating approximate digital multiplier with a plurality of n digital interpolation stages from a first digital interpolation stage i=0 up to a last digital interpolation stage i=n-1, wherein n is a total number of digital interpolation stages, and wherein each interpolation stage comprises at least one of the digital cell (Z);
   cascading a sequence of n of the digital cell (Z)s beginning with a first digital cell (Z) in the sequence corresponding to i=0 and ending with a last digital cell (Z) in the sequence corresponding to i=n-1;
   the pair of digital output ports ($PX_o$,$PY_o$) of the first digital cell (Z) communicating with the respective pair of digital input ports (Px,Py) of a second digital cell (Z) in the sequence corresponding to i=1;
   the pair of digital output ports ($PX_o$,$PY_o$) of each successive digital cell (Z) in the sequence communicating with the respective pair of digital input ports (Px,Py) of each subsequent successive digital cell (Z) in the cascaded sequence of the plurality (n) of the digital cell (Z)s; and
   wherein 1≤n≤10 and 1≤i+1≤10.

2. The approximate digital multiplication method in a digital state machine in an integrated circuit of claim 1, the method further comprising:
   receiving the pair of digital input words (x,y) at the digital input ports (Px,Py) of the first digital cell (Z) corresponding to i=0;
   generating a pair of digital output words $X_{Oi+1}$ and $Y_{Oi+1}$ at the digital output ports ($PX_o$,$PY_o$) of a respective $i^{th}$ digital cell (Z) in the cascaded sequence of the plurality (n) of the digital cell (Z)s;
   generating an interpolated approximate multiplication digital output word $xy_n$ in each of the respective $i^{th}$ digital cell (Z) in the cascaded sequence of the plurality (n) of the digital cell (Z)s, wherein $xy_{i+1}$ is substantially equal to a SUM from i=0 to i=n-1 of a product of $X_{Oi+1}$ and $-\frac{1}{2}^{(2i)}$ wherein $$xy_{i+1} = xy_i + \frac{1}{2^{2i}} X_{Oi+1},$$

and wherein $xy_o$=0 for i=0; and
   wherein the digital output word $xy_n$ is an approximate digital product of the digital input words (x,y), and wherein $xy_n$=$xy_{i+1}$≈x×y.

3. The approximate digital multiplication method in a digital state machine in an integrated circuit of claim 2, the method further comprising:

generating an at least another interpolated approximate multiplication digital output word ($xy_{nA}$) in at least another digital cell (Z) wherein $xy_{nA}=xy_{(i+1)A}=xy_{i+1}+(Xo_{i+1} \times yo_{i+1})/2^{2i}$, wherein $$xy_{i+1} = xy_i + \frac{1}{2^{2i}} Xo_{i+1}.$$

* * * * *